(12) United States Patent
Timmons

(10) Patent No.: US 8,260,844 B2
(45) Date of Patent: Sep. 4, 2012

(54) INFORMATION MESSAGING AND COLLABORATION SYSTEM

(75) Inventor: Michael Timmons, San Jose, CA (US)

(73) Assignee: Sybase, Inc., Dublin, CA (US)

( * ) Notice: Subject to any disclaimer, the term of this patent is extended or adjusted under 35 U.S.C. 154(b) by 1256 days.

(21) Appl. No.: 11/947,437

(22) Filed: Nov. 29, 2007

(65) Prior Publication Data

US 2008/0086736 A1    Apr. 10, 2008

Related U.S. Application Data

(63) Continuation of application No. 10/708,187, filed on Feb. 13, 2004, now abandoned.

(60) Provisional application No. 60/481,287, filed on Aug. 25, 2003.

(51) Int. Cl.
G06F 15/16 (2006.01)
G06F 3/00 (2006.01)
G06F 9/44 (2006.01)
H04L 12/28 (2006.01)

(52) U.S. Cl. ........ 709/203; 719/314; 719/328; 719/329; 370/395.54

(58) Field of Classification Search .................... 709/203
See application file for complete search history.

(56) References Cited

U.S. PATENT DOCUMENTS

| | | |
|---|---|---|
| 4,959,769 A | 9/1990 | Cooper et al. |
| 4,965,763 A | 10/1990 | Zamora |
| 5,181,162 A | 1/1993 | Smith et al. |
| 5,267,155 A | 11/1993 | Buchanan et al. |
| 5,327,554 A | 7/1994 | Palazzi, III et al. |
| 5,347,632 A | 9/1994 | Filepp et al. |
| 5,392,428 A | 2/1995 | Robins |
| 5,408,655 A | 4/1995 | Oren et al. |
| 5,423,043 A | 6/1995 | Fitzpatrick et al. |
| 5,530,852 A | 6/1996 | Meske et al. |
| 5,649,186 A | 7/1997 | Ferguson |
| 5,737,560 A | 4/1998 | Yohanan |
| 5,754,939 A | 5/1998 | Herz et al. |
| 5,758,361 A | 5/1998 | Van Hoff |
| 5,761,662 A | 6/1998 | Dasan |
| 5,764,906 A | 6/1998 | Edelstein et al. |
| 5,794,257 A | 8/1998 | Liu et al. |
| 5,850,352 A | 12/1998 | Moezzi et al. |
| 5,867,661 A | 2/1999 | Bittinger et al. |

(Continued)

OTHER PUBLICATIONS

McDuffie, T., JavaScript Concepts and Techniques: Programming Interactive Web Sites (Chapters 1 and 2), Franklin, Bedde, and Associates, Jan. 2003.

(Continued)

Primary Examiner — Wing Chan
Assistant Examiner — David X Yi
(74) Attorney, Agent, or Firm — Edell, Shapiro & Finnan, LLC

(57) ABSTRACT

An information messaging and collaboration system is described. In one embodiment, for example, a method is described for interactive content retrieval and display, the method comprises steps of: providing a plurality of portlets for retrieval of content for display in a user interface; mapping a message action to a first portlet to create a messaging portlet for sending a message in response to user interaction with the messaging portlet; creating a listener portlet by registering a second portlet to receive messages from the messaging portlet; and in response to user interaction with the messaging portlet, retrieving particular content for display in the user interface based on the message received by the listener portlet from the messaging portlet.

52 Claims, 12 Drawing Sheets

U.S. PATENT DOCUMENTS

| | | |
|---|---|---|
| 5,870,559 A | 2/1999 | Leshem et al. |
| 5,877,766 A | 3/1999 | Bates et al. |
| 5,878,218 A | 3/1999 | Maddalozzo et al. |
| 5,886,683 A | 3/1999 | Tognazzini et al. |
| 5,887,139 A | 3/1999 | Madison et al. |
| 5,890,152 A | 3/1999 | Rapaport et al. |
| 5,890,171 A | 3/1999 | Blumer et al. |
| 5,894,554 A | 4/1999 | Lowery et al. |
| 5,897,644 A | 4/1999 | Nielsen |
| 5,898,830 A | 4/1999 | Wesinger et al. |
| 5,917,997 A | 6/1999 | Bell et al. |
| 5,923,854 A | 7/1999 | Bell et al. |
| 5,926,179 A | 7/1999 | Matsuda et al. |
| 5,933,596 A | 8/1999 | Mayhew |
| 5,945,993 A | 8/1999 | Fleischmann |
| 5,954,798 A | 9/1999 | Shelton et al. |
| 5,956,038 A | 9/1999 | Rekimoto |
| 5,961,594 A | 10/1999 | Bouvier et al. |
| 5,974,455 A | 10/1999 | Monier |
| 5,983,262 A | 11/1999 | Kukkal |
| 5,991,798 A | 11/1999 | Ozaki et al. |
| 5,999,944 A | 12/1999 | Lipkin |
| 6,003,065 A | 12/1999 | Yan et al. |
| 6,006,260 A | 12/1999 | Barrick et al. |
| 6,006,264 A | 12/1999 | Colby et al. |
| 6,009,429 A | 12/1999 | Greer et al. |
| 6,026,433 A | 2/2000 | D'Arlach et al. |
| 6,029,182 A | 2/2000 | Nehab et al. |
| 6,032,162 A | 2/2000 | Burke |
| 6,038,598 A | 3/2000 | Danneels |
| 6,052,730 A | 4/2000 | Felciano et al. |
| 6,058,425 A | 5/2000 | White |
| 6,061,695 A | 5/2000 | Slivka et al. |
| 6,067,559 A | 5/2000 | Allard et al. |
| 6,182,116 B1 | 1/2001 | Namma et al. |
| 6,408,360 B1 | 6/2002 | Chamberlain et al. |
| 6,430,624 B1 | 8/2002 | Jamtgaard et al. |
| 6,507,867 B1 | 1/2003 | Holland et al. |
| 6,735,586 B2 | 5/2004 | Timmons |
| 2004/0002944 A1 | 1/2004 | Hauser et al. |
| 2004/0090969 A1* | 5/2004 | Jerrard-Dunne et al. 370/395.54 |
| 2004/0098360 A1 | 5/2004 | Witwer et al. |
| 2004/0199541 A1 | 10/2004 | Goldberg et al. |
| 2005/0071853 A1* | 3/2005 | Jones et al. .................. 719/328 |
| 2005/0175015 A1 | 8/2005 | Ramaswamy et al. |
| 2006/0053376 A1 | 3/2006 | Ng et al. |

OTHER PUBLICATIONS

W3C, Document Object Model (DOM) Level 2 Core Specification Version 1.0, W3C Recommendation Nov. 13, 2000.

* cited by examiner

330

Company Directory

Company Name: IBM
Street: 1466 Sam Huston
City: Austin
State: Texas
Zip: 54001

[Submit Query]

Company Directory

Company Name:
Street:
City:
State:
Zip:

[Submit Query]

INFORMATION MESSAGING AND COLLABORATION SYSTEM

CROSS REFERENCE TO RELATED APPLICATIONS

This application is a continuation of U.S. application Ser. No. 10/708,187, filed Feb. 13, 2004, which claims the benefit of U.S. Provisional Application No. 60/481,287, filed Aug. 25, 2003, entitled "Information Messaging and Collaboration System". The present application is related to the following commonly-owned, presently-pending application(s): application Ser. No. 09/780,993, filed Feb. 8, 2001, entitled "System and Method for Dynamic Content Retrieval". The disclosures of each of the foregoing applications are hereby incorporated by reference in their entirety entireties, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.text, created: Aug. 14, 2003 8:29 am, size: 3.98 KB; Object ID: File No. 1; Object Contents: Source Code.

BACKGROUND OF INVENTION

1. Field of the Invention

The present invention relates generally to information processing environments and, more particularly, to an information messaging and collaboration system providing methodology for dynamic collection and forwarding of information among system components enabling such components to process the information, modify their contents, and take action based on the information.

2. Description of the Background Art

Computers are very powerful tools for storing and providing access to vast amounts of information. The first personal computers were largely stand-alone units with no direct connection to other computers or computer networks. Data exchanges between computers were mainly accomplished by exchanging magnetic or optical media such as floppy disks. Over time, more and more computers were connected to each other and exchanged information using Local Area Networks ("LANs") and/or Wide Area Networks ("WANs"). Initially such connections were primarily amongst computers within the same organization via an internal network. More recently, the explosive growth of the Internet has provided access to tremendous quantities of information from a wide variety of sources.

The Internet comprises a vast number of computers and computer networks that are interconnected through communication links. The World Wide Web (WWW) portion of the Internet allows a server computer system to send graphical Web pages of information to a remote client computer system. The remote client computer system can then display the Web pages in a Web browser application (e.g., Netscape Navigator or Microsoft Internet Explorer). To view a specific Web page, a client computer system specifies the Uniform Resource Locator ("URL") for that Web page in a request (e.g., a HyperText Transfer Protocol ("HTTP") request). The request is forwarded to the Web server that supports that Web page. When that Web server receives the request, it sends the specified Web page to the client computer system. When the client computer system receives that Web page, it typically displays the Web page using a browser application.

Currently, Web pages are typically defined using Hyper-Text Markup Language ("HTML"). HTML provides a standard set of tags that define how a Web page is to be displayed. When a user indicates to the browser to display a Web page, the browser sends a request to the server computer system to transfer to the client computer system a HTML document that defines the Web page. When the requested HTML document is received by the client computer system, the browser displays the Web page as defined by the HTML document. The HTML document contains various tags that control the displaying of text, graphics, controls and other features. The HTML document may also contain URLs of other Web pages available on that server computer system or other server computer systems. Web pages may also be defined using other markup languages, including cHTML, XML, and XHTML.

Every day, more and more information is made available via the Internet. The challenge posed to users is how to efficiently locate, access and use information and applications that are relevant to them from amongst the huge quantities of materials that are available in a variety of different formats. For example, a user may wish to collect information from three different sources. Each of these sources may potentially maintain information in a different format. For instance, one source may be a database, a second may be a spreadsheet, and a third may be a Web page.

One mechanism for providing access to personalized information is a "portal". Corporate portals or enterprise information portals (EIPs) have many uses and advantages, but the most common overarching task of any portal is to provide users with efficient access to personalized information and applications. For an internal network, this can mean employee information such as retirement account balances and vacation requests. It may also include sales force automation and enterprise resource planning (ERP) applications. Externally, portals can collect and make information available to third parties such as business partners and customers. Portals can be used to simplify customer support, drive e-business, and/or accelerate content distribution.

A basic portal assembles static information in a single browser page for employee or customer use. Typically, static content is retrieved and placed into a giant repository which maintains all of the information used in the portal. The information is then reformatted and published to users of the portal. However managing a huge repository of content presents a number of difficulties to the organization operating the portal. One problem is that some types of information must be constantly updated. For example, stock prices or weather reports change regularly and frequently. Another problem is operating the portal and managing the associated data typically requires a skilled technical team.

To make portals more effective, organizations need to make their portals dynamic and flexible. A dynamic portal pulls updated information from company databases and other sources available through the Internet. For example, when a user goes to her home page, she wants to see the most recent headlines—not yesterday's news. A flexible portal is able to update information even if its content or location changes. In addition, organizations using portals try to make them sufficiently flexible so that they can be utilized to deliver information to new devices and new audiences in new formats.

There are a number of benefits that can be realized by ensuring that a portal is dynamic and flexible. Dynamic content guarantees the site will remain fresh and relevant for employees and third parties (e.g., customers and business partners). Without updated content, audiences will likely go elsewhere for information, and a significant investment in implementing the portal will be wasted. In addition, dynamic content makes the site more useful; keeping users on top of actionable information that can help them perform various activities.

A basic portal assembles static information in a single browser page for internal (e.g., employee) or external (e.g., customer) use. In order to provide increased relevance and flexibility what is needed is a solution that will automatically identify and gather information from many different sources (e.g., databases, flat files, documents, Web pages, and the like). The solution should combine this information to create portals that are dynamic and publish this information in real time. The solution should also enable information that is collected to be forwarded to other portals which can also modify their contents in real time, take action based on the information, and process the information (e.g., on a server or inside the user's browser) before presenting the information to the user. In addition, the solution should be easy to implement and should not require significant programming expertise or a huge repository for storing information that is collected. The present invention provides a solution for these and other needs.

SUMMARY OF INVENTION

An information messaging and collaboration system is described. In one embodiment, for example, a method of the present invention is described for interactive content retrieval and display, the method comprises steps of: providing a plurality of portlets for retrieval of content for display in a user interface; mapping a message action to a first portlet to create a messaging portlet for sending a message in response to user interaction with the messaging portlet; creating a listener portlet by registering a second portlet to receive messages from the messaging portlet; and in response to user interaction with the messaging portlet, retrieving particular content for display in the user interface based on the message received by the listener portlet from the messaging portlet.

In another embodiment, for example, a system of the present invention is described for interactive content retrieval and display, the system comprises: a user interface for display of content; an actioner module for display of content in the user interface and sending a message based on user interaction with the actioner module; a registrar for receiving the message from the actioner module and routing the message to at least one listener module registered to receive the message; and at least one listener module registered for receiving the message from the registrar and retrieving content for display in the user interface based on the message sent by the actioner module.

In yet another embodiment, for example, a method of the present invention is described for collaborative retrieval and display of information in a Web page, the method comprises steps of: providing a plurality of elements for retrieval and display of information in a Web page; creating a registrar for receiving a message and routing the message to at least one listening element registered to receive the message; associating a message action with a first element for sending a message in response to user interaction with the first element; registering at least one listener element with the registrar for receiving a message sent by the first element; and in response to user interaction with the first element, displaying particular information on the Web page based on the message received by the at least one listener element from the first element.

BRIEF DESCRIPTION OF DRAWINGS

FIG. 3C is a bitmap screenshot illustrating a portlet that inserts/retrieves data from a database capture object when the user selects the "submit query" button.

FIG. 3D is a bitmap screenshot illustrating an address mPortlet created based on mapping an action item to the portlet of FIG. 3C.

DETAILED DESCRIPTION

Glossary

Figure 1:
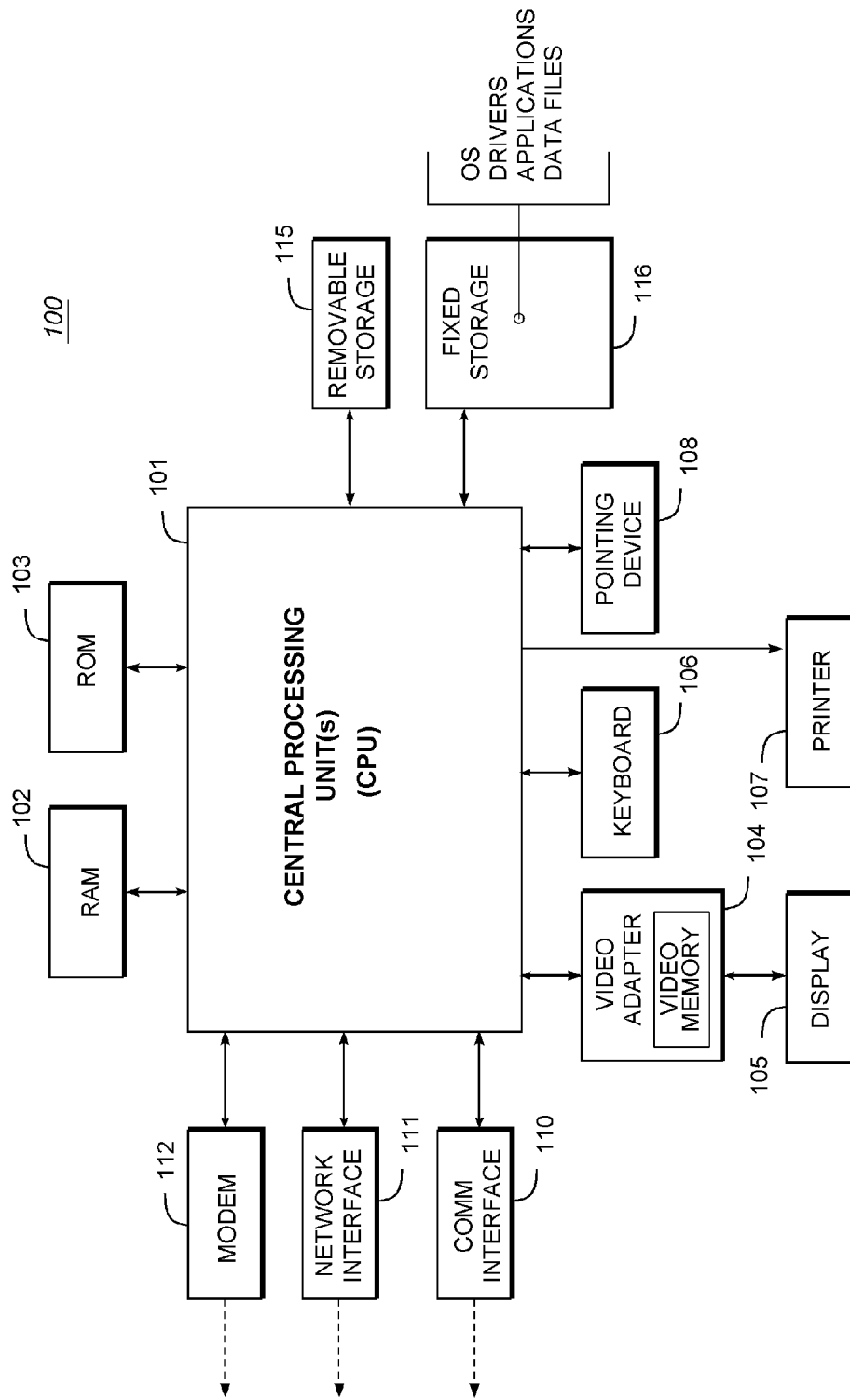
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java virtual machine and the Microsoft .NET virtual machine provide a compiler to transform the respective source program (i.e., a Java program or a C# program, respectively) into virtual machine bytecodes.

Document Object Model or DOM: The Document Object Model (DOM) is a platform- and language-neutral interface that allows programs and scripts to dynamically access and update the content, structure and style of documents. The document can be further processed and the results of that processing can be incorporated back into the presented page. For further information regarding the Document Object Model, see e.g., "Document Object Model (DOM) Activity Statement" available from the World Wide Web consortium (W3C), the disclosure of which is hereby incorporated by reference. A copy of this document is available via the Internet (e.g., currently at www.w3.org/DOM).

CGI: CGI is an abbreviation of Common Gateway Interface, a specification for transferring information between a World Wide Web server and a CGI program. A CGI program is any program designed to accept and return data that conforms to the CGI specification. CGI programs are a common way for Web servers to interact dynamically with users. Many HTML pages that contain forms, for example, use a CGI program to process the form's data once it is submitted. Another increasingly common way to provide dynamic feedback to Web users is to include scripts or programs that run on the user's machine rather than the Web server. These programs may comprise Java applets, Java scripts, or ActiveX controls. These technologies are known collectively as client-side solutions, while the use of CGI is a server-side solution because the processing occurs on the Web server. For further information regarding CGI see e.g., "CGI Specification, Version 1.1" available from the National Center for Supercomputing Applications (NCSA), the disclosure of which is hereby incorporated by reference.

cHTML: Short for compact HTML, cHTML is a subset of HTML for small information devices, such as smart phones and PDAs. cHTML is essentially a pared down version of regular HTML. Because small devices such as cellular phones have hardware restrictions such as small memory, low power CPUs, limited or no storage capabilities, small mono-color display screens, single-character font and restricted input methods (the absence of a keyboard or a mouse), cHTML provides a simpler form of HTML for use with such devices.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors.

Java source code files (files with a .java extension) are compiled into a format called bytecode (files with a class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

JavaScript: JavaScript was designed by Netscape as an easy-to-use object-oriented scripting language that serves as an adjunct to the Java programming language. JavaScript is a small, lightweight language that is designed to be embedded in other products and applications, such as Web browsers. Inside a host environment, JavaScript can be connected to the objects of its environment to provide programmatic control over such objects. JavaScript code can be added to standard HTML pages to create interactive documents and has found considerable use in the creation of interactive Web-based forms. Most modern browsers, including those from Microsoft and Netscape, contain JavaScript support. For additional information on JavaScript, see e.g., "Core JavaScript Guide 1.5", from Netscape, the disclosure of which is hereby incorporated by reference. A copy of this documentation is available via the Internet (e.g., currently at devedge.netscape.com).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Portal: A portal provides an individualized or personalized view of multiple resources (e.g., Web sites) and services. A portal typically offers a single access point (e.g., browser page) providing access to a range of information and applications. A portal assembles information from a number of different sources (e.g., Web sites and applications) enabling a user to quickly receive information without having to navigate to a number of different Web sites. A portal also typically enables a user to obtain a personalized view of information and applications by organizing and grouping information and services for presentation to users. A portal may be considered to be composed of one or more portlets as defined below.

Portlet: A portlet is an object that is responsible for capturing and delivering information to a portal from a specific source. One or more individual portlets may then be organized on a Web page to create a portal for viewing by users using a browser. Information that may be captured by a portlet may include a Web page or portion of a Web page (e.g., collected from the World Wide Web), data retrieved from a database, flat files (e.g., spreadsheet data and documents), and/or information collected from custom interfaces to applications (e.g., information collected from an application via a Common Gateway Interface). For further information regarding portlets and portals, see e.g., "JSR168: Portlet Specification", the disclosure of which is hereby incorporated by reference. A copy of this specification is available via the Internet (e.g., currently at www.jcp.org).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

URL: URL is an abbreviation of Uniform Resource Locator, the global address of documents and other resources on the World Wide Web. The first part of the address indicates what protocol to use, and the second part specifies the IP address or the domain name where the resource is located.

XHTML: Short for Extensible Hypertext Markup Language, a hybrid between HTML and XML. XHTML is a family of current and future document types and modules that reproduce, subset, and extend HTML 4. XHTML family document types are XML based, and ultimately are designed to work in conjunction with XML-based user agents.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations.

For further description of XML, see, e.g., Extensible Markup Language (XML) 1.0 specification which is available from the World Wide Web Consortium (www.w3.org), the disclosure of which is hereby incorporated by reference. The specification is also available on the Internet (e.g., currently at www.w3.org/TR/REC-xml).

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC), a laptop computer, a notebook computer, a handheld or pocket computer, and/or a server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers, laptop computers, notebook computers, handheld computers, and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
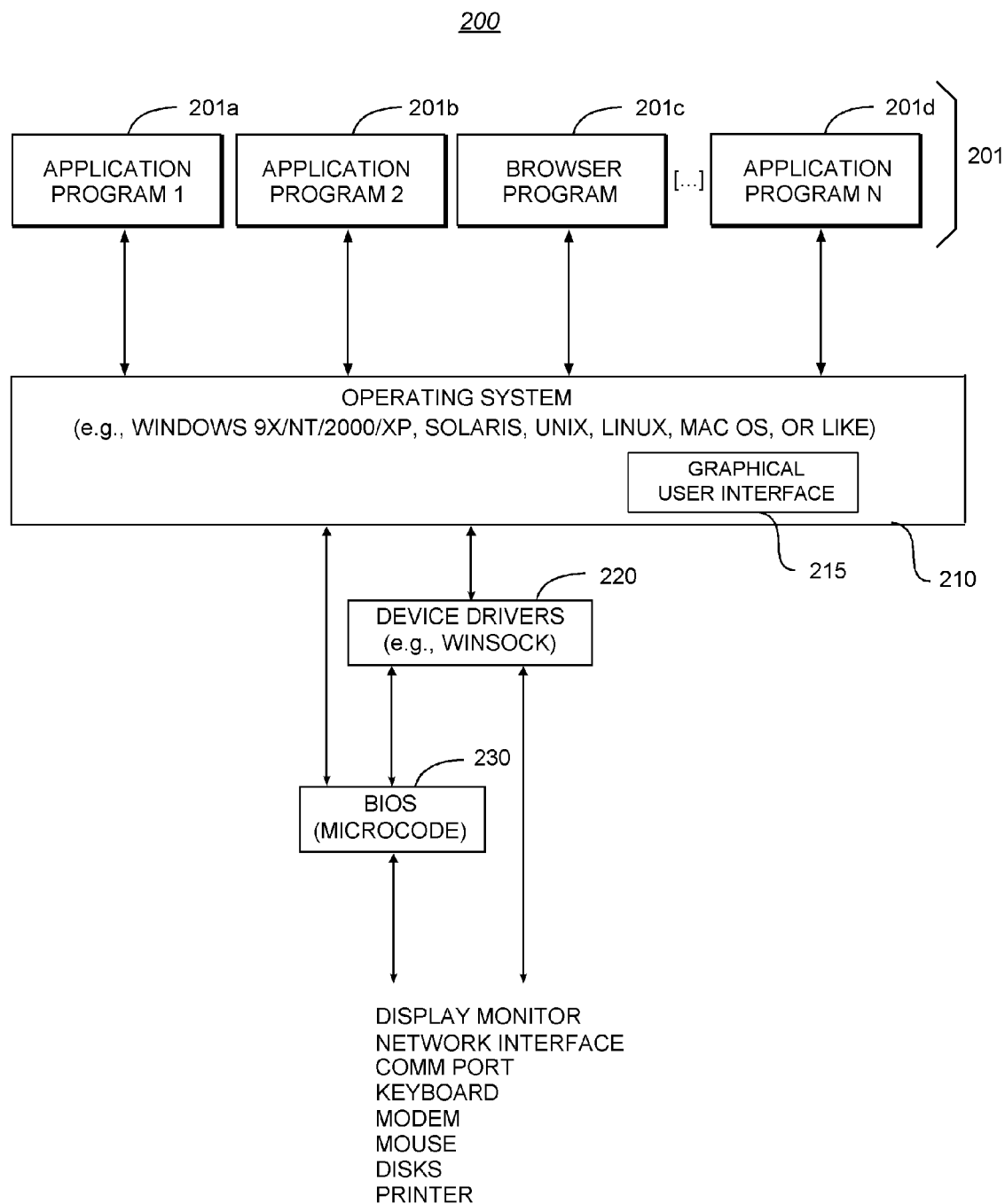
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of down-loadable computer-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers, laptop computers, notebook computers, handheld computers, "smart phones", personal digital assistants (PDAs), and/or other computing devices). The following discussion also uses examples of Web pages implemented using HTML; however, the present invention may also be used in conjunction with Web pages written in various other markup languages, including, but not limited to, cHTML, XML, and XHTML. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

A basic portal assembles static information in a single browser page (e.g., for use by employees or customers of an organization). To make portals more effective, organizations need to make their portals dynamic and flexible so that they are capable of collecting information from a variety of sources and updating the information even if its content or location changes from time to time. Dynamic content ensures that the site using the portal will remain fresh and relevant for employees and customers. Without updated content, audiences will go elsewhere for information, and the investment in the portal may be wasted. In addition, dynamic content makes the site more useful, keeping users on top of actionable information.

In discussing the use of dynamic content, one may think of a portal as comprised of individual "portlets", each of which in responsible for capturing and delivering information to the portal (e.g., a Web page) from a specific source. Examples of portlets include:

Static & dynamic HTML—a Web page or portion of a Web page collected from the World Wide Web.

Database content—data retrieved from a database.

Flat File—spreadsheet data and documents (e.g., Adobe PDF files).

Custom Interfaces to Legacy Web Applications—information collected from any accessible API (e.g., a Common Gateway Interface).

Individual portlets may then be laid out on a Web page to create a portal. Thus, the task of building and maintaining a portal is, in many ways, essentially the task of building and maintaining individual portlets and coordinating their display.

The present invention introduces the concept of a "messaging portlet" or "mPortlet" for collecting and combining information from a number of different sources in a manner which provides real-time, interactive (i.e., user driven) content aggregation. A "messaging portlet" or "mPortlet" can be defined as a portlet that participates in sharing information between itself and other messaging portlets (mPortlets). Distinct and independent portlets have no knowledge of each other, their parameter requirements, and their subsequent actions. Messaging portlets are designed to be "autonomous" from other messaging portlets, from the hosting application server, and from the container in which they are enclosed. A messaging portlet can be viewed as an object with well defined messages that are "broadcast" to other mPortlet (and mContainer) objects that are "listening" for specific message content. Using well-defined message definitions, the mPortlets are "reusable" objects that can participate intelligently in combination with other mPortlets to form more dynamic and flexible portals and to establish a new form of Web application.

Information from many different sources can be used to create a messaging portlet (mPortlet). A messaging portlet can also be combined with other mPortlets to create an integrated Web based application. In addition, a "messaging container" or "mContainer" can be built based on several mPortlets. The use of messaging portlets created in accordance with the present invention provides a new type of Web application or service that can provide users with a powerful mechanism for developing new business process and analysis techniques. One advantage of this architecture is that a messaging container including several mPortlets can be deployed on any "common" Web server, and be viewed from any common browser. No operating system or browser specific code is required for implementation of these mContainers. Messaging containers can also be used within any existing content management system. These features make it easy for users to adopt, deploy, and utilize this technology.

It should be noted that there are a number of other widely used terms that are generally related to (but should be distinguished from) the messaging portlet concept. The terms "cooperative portlets" or "collaborative portlets" have been used to describe related (but different) concepts. The use of the term "collaborative portlets", in particular, has been associated with the ability to include user or group collaboration-type functions in a portal. This definition is somewhat confusing since it crosses the definition of a portlet that includes user or group collaborative functions with a portlet that can "communicate" with other portlets. The definition and implementation of the messaging portlets (mPortlets) of the present invention as described in this document is not limited to portlets that provide user or group collaboration-type functions, but rather extends as well to other types of portlets providing other functions.

The present invention combines the use of messaging portlets with an innovative user interface that makes the solution easy to implement and use. A user without extensive technical skills or training can use the solution for identifying, extracting, and retrieving information in a number of situations that previously required complex development tasks. The system and methodology of the present invention for information messaging and collaboration will now be described in more detail.

Example of Operations

Creation of Messaging Portlets

Figure 3A:
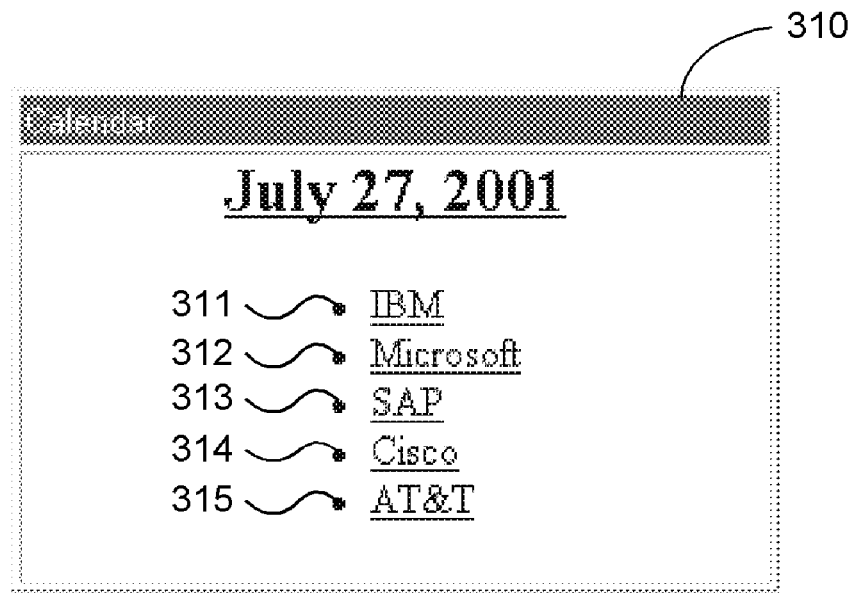
FIG. 3A is a bitmap screenshot illustrating an appointment portlet that is captured from a calendar application.

FIG. 3A illustrates a standard appointment portlet 310 that is captured from a calendar application. As shown, FIG. 3A shows five appointments 311, 312, 313, 314, and 315 (each identified by a bullet point and a company name) on Jul. 27, 2001. Each appointment is a HTML anchor. In the example illustrated at FIG. 3A, the user may wish to click on any of the five appointment anchors 311-315 (i.e., company names) in order to drill down into details about the given appointment.

Figure 3B:
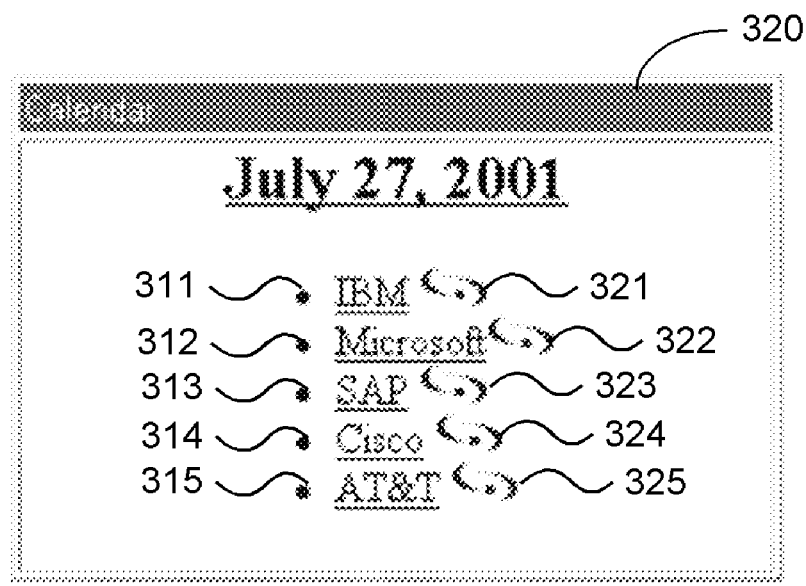
FIG. 3B is a bitmap screenshot illustrating an example messaging portlet (mPortlet) which is constructed in accordance with the methodology of the present invention based on the appointment portlet of FIG. 3A.

FIG. 3B illustrates an example messaging portlet (mPortlet) 320 which is constructed in accordance with the methodology of the present invention based on the appointment portlet of FIG. 3A. As shown, five action icons 321, 322, 323, 324, and 325 have been added to the standard appointment portlet, with one icon added after each of the five appointment anchors 311-315 (company names).

The process of creating a calendar messaging portlet (e.g., mPortlet 320) from the standard portlet of FIG. 3A includes performing a "mapping" operation in which the user can select the type of content they wish to map to a message. "Mapping" is the process of matching a user assigned label to anchors, input forms, CGI parameters and other "information landmarks" such as SQL database queries and Excel spreadsheet objects. Using "feature extraction" methodology of the present invention, a signature or "Web fingerprint" of each item of information (or "information atom") in the portlet is created. The user can then "map" portlet contents to actions. In the example illustrated at FIG. 3B, the user may wish to click on any of the five appointment anchors 311-315 (i.e., company names) and still have the calendar mPortlet 320 operate in the same manner as with the static portlet 310 of FIG. 3A (e.g., to provide further detail about each of the appointments).

As the appointment anchors are mapped, "action icons" 321-325 are added after each of the five appointment anchors 311-315 as shown at FIG. 3B. When selected (e.g., clicked on) these action icons, may, for example, broadcast a message containing the visible text of the anchor which is then displayed to the user. It should be noted that the action icon is only one example of a mechanism that can be used to initiate action. Various different icons or other methods may be used to enable a user to initiate actions from a given messaging portlet or container. Also, different types of action icons can be used within a messaging portlet. For example, one can have a message with a name "Company Name" with an icon of a building. If the messaging portlet also includes anchors that are stock symbols, they could be assigned a different action icon. In the currently preferred embodiment, the mPortlet objects that share the same feature extraction tag generally have the same action icon (i.e., an icon with a similar appearance) and the same message name (i.e., the message name must be unique to the mPortlet). Every different "feature tag" on a Web page can be mapped to send a different message. The message can be an identifier, the anchor's visible text, the anchor's original HREF (an attribute indicating the URL to be loaded when a hyperlinked object is activated), or any other information contained in the anchor tag.

Mapping is performed in a similar manner to that used for HTML forms. FIG. 3C illustrates a simple portlet 330 that inserts/retrieves data from a database capture object when the user selects the "submit query" button 331. FIG. 3D illustrates an address mPortlet 340 created based on mapping an action item to the simple portlet 330 of FIG. 3C. When the form is mapped, the designer can replace the POST attribute of the form (data capture object) with a JavaScript broadcast message. As shown at FIG. 3D, in this example an "action icon" 343 is added next to the "submit query" button 341. If the user clicks on the "submit query" button 341, the form will operate exactly as it would if no "interactive" objects (i.e., action icons) were added to it. However, clicking on the action icon 343 causes the contents to be broadcast to other mPortlets (not shown at FIG. 3D) listening to receive the information. In the currently preferred embodiment, these other "mPortlet" listeners will not receive messages if the user clicks on the "submit query" button 341.

Figure 3E:
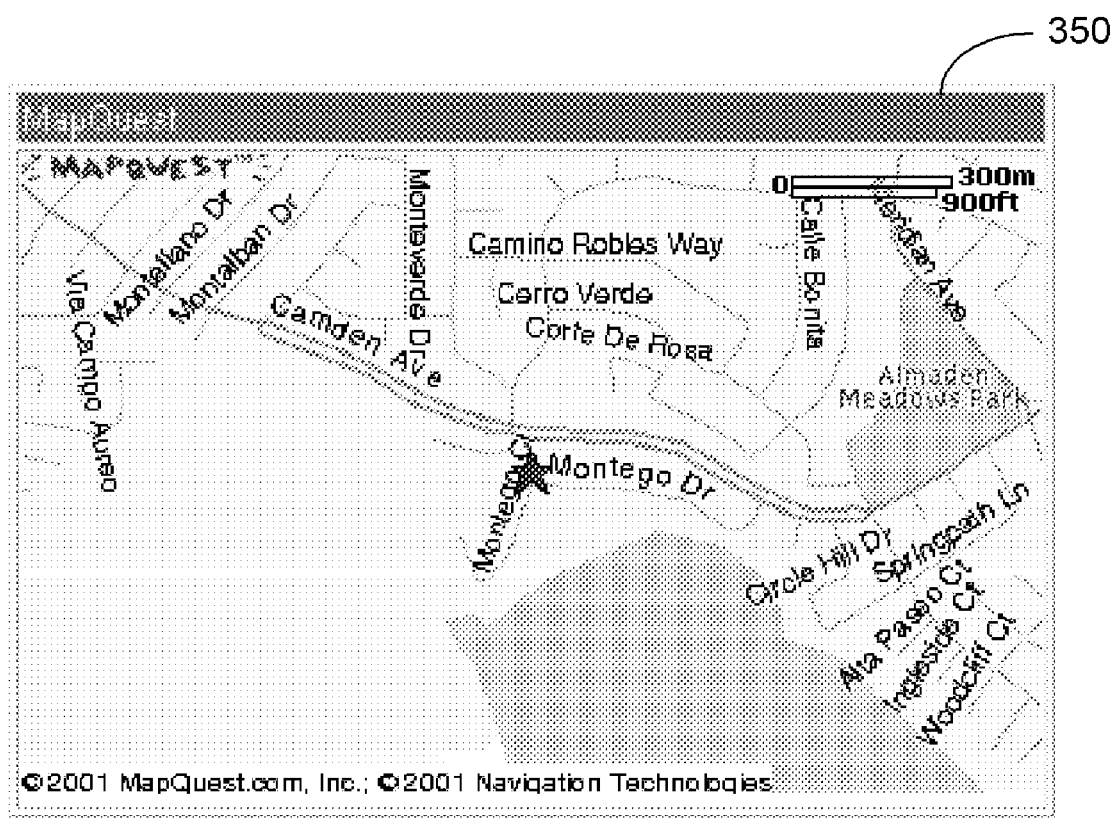
FIG. 3E is a bitmap screenshot illustrating a sample map mPortlet which is generated as the result of a CGI post.

In a situation in which a given messaging portlet captures the result of a Common Gateway Interface (CGI) post, the actual CGI parameters can be replaced with information received from other mPortlets. For example, FIG. 3E illustrates a sample map mPortlet 350 which is generated as the result of a CGI post. When the mPortlet 350 shown at FIG. 3E is built it is configured to "listen" for messages containing parameters it needs to complete the CGI parameter list. In this example the mPortlet 350 does not have any associated "action icons". Instead, the mPortlet 350 shown at FIG. 3E is a pure "listener" that waits for messages from other mPortlets (e.g., mPortlet 340) before posting the parameters to the host MapQuest application. For instance, address information sent by another mPortlet may cause mPortlet 350 to display a map that depicts the location of the given address.

Figure 3F:
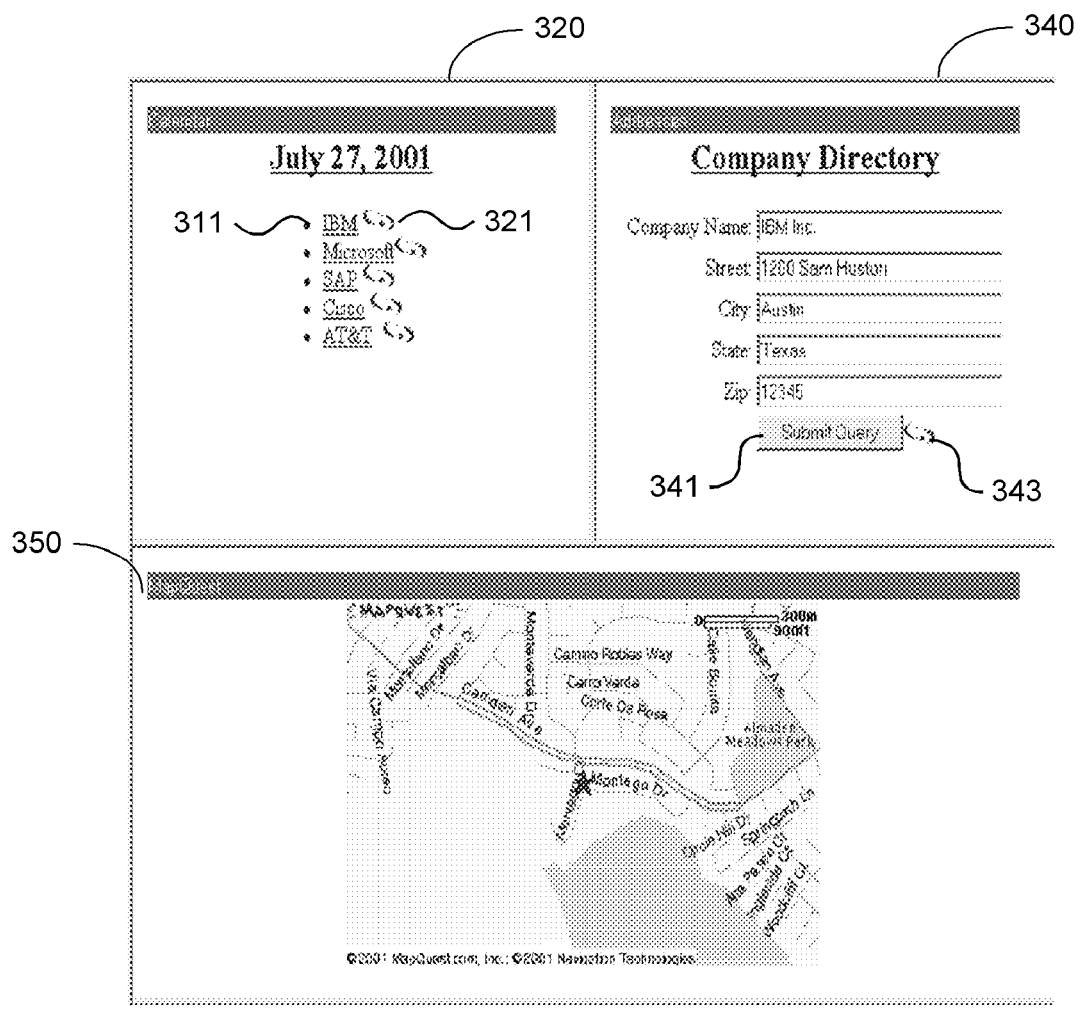
FIG. 3F is a bitmap screenshot illustrating interactions between a calendar mPortlet, an address mPortlet, and a map mPortlet.

FIG. 3F illustrates interactions between the calendar mPortlet 320, the address mPortlet 340, and the map mPortlet 350. The interactive nature of these three messaging portlets enables a user to check his calendar for a given day in calendar mPortlet 320. The user may then click on the "anchor" of a given appointment (e.g., appointment anchor 311) to drill down into the information or click on the "action icon" 321 associated with this appointment to send the information to the address mPortlet 340. If the user elects to click on the action icon 312 next to the appointment anchor 311, a message is sent to the associated address mPortlet 340. The address mPortlet 340 uses the name of the company (IBM in this example) received from the calendar mPortlet 320 to query a database server and fill in the form to display the address of the company.

The user can then send the form's information to the host using the Submit Query button 341 or select the action icon 343 to send the information to the map mPortlet 350 which is waiting for the information necessary to complete a CGI POST to a MapQuest host application. The address information sent to the map mPortlet 350 causes a map centered on the company address to be displayed to the user in a browser interface.

Methods of Interacting with Messaging Portlet

In the currently preferred embodiment, there are several different ways a user can interact with portlets and messaging portlets (mPortlets), including the following:

Click-Thru: Click-Thru refers to the act of refreshing the same portlet with the action of a link or a HTML form in that portlet. This is commonly used in a portlet containing Java Server Page (JSP) elements. Portlets containing JSP elements generally contain actions that change the display dependent on user data entry. This is also sometimes referred to as "Inline click-thru".

Click-Out: Click-Out refers to the action of opening a new browser window that contains the action of a link or a HTML form in the original portlet. This is commonly used by portlets containing Web elements to provide for the whole page of the link's action to be displayed in a new browser window.

Click-Across: Click-Across is a new term introduced by the implementation of messaging portlets (mPortlets) referring to the act of refreshing a related portlet's or mPortlet's window content based on the original mPortlet's action or contents. This is an important feature of a messaging portlet and may be used in conjunction with mPortlets containing all types of elements (e.g., Java server pages, Web, HTML, Java, XML, XHTML, cHTML, Web services, etc.).

In the example shown at FIG. 3F, the calendar mPortlet 320, the address mPortlet 340, and the map mPortlet 350 may send messages to each other and to the server. This example illustrates how three messaging portlets can work together to form a very simple Web application made from components pulled from different sources and technologies. Messaging portlets can also be bundled together into a group that can be combined as building blocks with other Web applications to produce more powerful and complex applications.

Building Web Applications Using mPortlets and mContainers

The basic building blocks for powerful Web applications that use the messaging portlets of the present invention as the smallest element are referred to herein as "messaging containers" or "mContainers". As previously described, a "messaging container" or "mContainer" is an object that contains one or more messaging portlets (mPortlets). The messaging containers (mContainers) can be used in several different ways. Messaging containers can be executed on a server to combine several processes to produce a portlet view that will be displayed on the client. Messaging containers can also be used to communicate with other mContainers in the same manner that mPortlets communicate with each other. In addition, mContainers can be used within other content management systems to provide mPortlet functionality in systems designed for static HTML portlets. Off-screen mContainers can be scheduled (e.g., using an "agent" or manager component) to collect content and cache the new mPortlet in the Web application's "ready cache" for quick rendering. A messaging container located on a server can be called from a messaging portlet so that aggregation of data is performed on the server and the aggregated results returned to the requesting mPortlet. In addition, a Web application can be built using several mContainers, each sending messages to other mContainers. Significantly, complex programming is not required in order to use mPortlets and mContainers to build powerful Web applications.

Popular Web applications place an emphasis on "Web transactions" in which a page request is received and a page is returned from a database definition or a HTML static file. Real-time content collection, aggregation, and especially "interactive" Web applications require a Web application architecture that has all of the advantages of a content management system (CMS) for delivering the mContainer definition, but is scalable enough to handle CPU-intensive requests, such as a request to find a single object within a page of objects. The mPortlets and mContainers of the present invention are very scalable as all of the message maps are downloaded to the client with each mPortlet so that all messaging can be handled by the client. An environment in which the system of the present invention may be preferably implemented will now be described.

System Components

Figure 4:
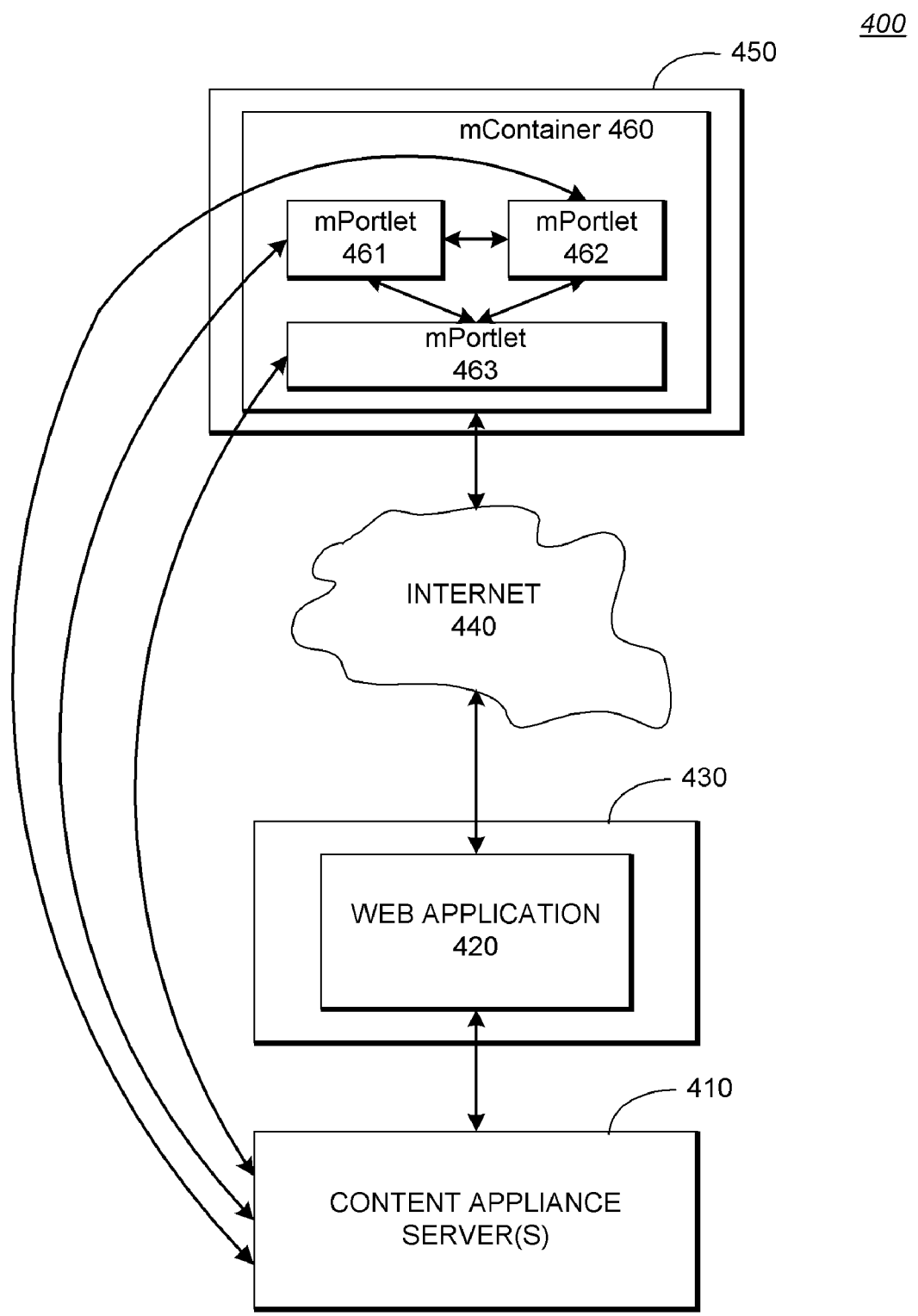
FIG. 4 illustrates an environment in which the system and methodology of the present invention may be implemented.

FIG. 4 illustrates an environment 400 in which the system and methodology of the present invention may be implemented. As shown at FIG. 4, environment 400 includes one or more content appliance server(s) 410, a Web application 420 running on a Web server 430, and a client 450 connected to the Web application 420 on the Web server 430 via the Internet 440. As also shown, a messaging container (mContainer) 460 including three messaging portlets (mPortlets) 461, 462, and 463 is in operation on the client 450. Although a single client is shown at FIG. 4 for illustration, a typical environment will include a plurality of clients 450 connected to the Web application 420. Each of these components and their operations are described below in more detail.

The content appliance server(s) 410 identify, capture, and retrieve items of content. In the currently preferred embodiment, specialized content appliance servers are employed which are built from a tuned Linux kernel and configured to efficiently perform the task of retrieving content (e.g., from the World Wide Web). Further description of a system providing methods for dynamic capture and retrieval of content is provided in commonly-owned, copending U.S. patent application Ser. No. 09/780,993 titled "System and Method for Dynamic Content Retrieval", the disclosure of which is hereby incorporated by reference. As capture requests increase with the number of users, additional content appliance servers 410 can are added to the cluster shown at FIG. 4. Load balancing software or hardware, such as the Cisco LoadDirector, can be used for load balancing of content appliance servers in the cluster.

The Web application 420 is an Internet-enabled application that is operating on a Web server 430. The Web application 420 includes one or more messaging portlets and/or messaging containers created in accordance with the methodology of the present invention. Typically, a user (e.g., a developer, content manager, or other "knowledge worker") creates one or more mPortlets using the system and methodology of the present invention. For example, the user may create the three mPortlets 461, 462, 463 shown at FIG. 4. A messaging container is then typically created as a container for the mPortlets. In this example, the mContainer 460 is created and the mPortlets 461, 462, 463 are included in the mContainer 460. The mContainer 460 is then published through the Web application 420 (e.g., a PlumTree Web application or BEA Personalization Server application). The mContainer 460 being displayed within the Web application 420 does not require any change to the hosting server's implementation. Messaging within the mContainer is handled by the browser on the client device 450, and refreshing of content is handled by requests from each mPortlet (i.e., mPortlets 461, 462, 463) to the content appliance server(s) 410.

As shown at FIG. 4, the client 450 accesses and loads the mContainer 460 that has been published by the Web application 420 on the Web server 430. On the client 450, each of the mPortlets (i.e., mPortlets 461, 462, 463) in the mContainer 460 refreshes itself by making a request to the content appliance server(s) 410 as shown at FIG. 4. In response to a user of the client device 450 entering data, or clicking on (i.e., selecting) different action icons, a message may be sent to other mPortlets. Each of the mPortlets also refreshes itself by making a request to the content appliance server(s) 410.

The mContainer(s) 460 and mPortlets 461, 462, 463 can be exported and run within a number of different content management systems (e.g., BEA and PlumTree content management systems) by appearing to be a standard HTML portlet or object. In addition, a messaging container (e.g., mContainer 460 as shown at FIG. 4) can look like a standard HTML portlet while still providing a messaging environment for its enclosed mPortlets (e.g., mPortlets 461, 462, 463). Each of the mPortlets is an autonomous object designed to be reusable. A messaging portlet is autonomous in that it does not know who is sending or receiving any message, it only knows about itself, not its neighbors or its parents. Inter-portlet messaging is handled by the browser without requiring Web application host interaction.

Messaging containers (mContainers) can communicate with other mContainers to produce complex but scalable Web applications drawing content in real-time from the Web, databases, flat files, and legacy Web applications. These mContainers can run on a client browser or be scheduled to run on the server by "agent" components. Also, mContainers can start on a client device, with messages sent to an "off screen" mContainer that will produce new content and send this new content directly to the user's browser on the client device. Offscreen mContainers can also be scheduled by an "agent" (or manager) to collect content and cache the new mPortlet in a "ready cache" of a Web application for quick rendering as previously described.

Implementation of Messaging Portlets

Browser Frame Organization

In the currently preferred embodiment of the present invention, portlets on a page are organized and implemented as separate HTML inline frames to facilitate independent loading. Each HTML inline frame operates as a separate portlet.

One of the options for representing a portlet is to represent the portlet as a HTML inline frame, using the HTML IFRAME tag. An inline frame (floating frame) is a construct which embeds a document into a HTML document so that embedded data is displayed inside a sub-window of the browser's window. This does not mean full inclusion; the two documents are independent, and both them are treated as complete documents, instead of treating one as part of the other. Most, but not all, browsers support this inline frame HTML tag. (Note that the IFRAME tag is described in the HTML 4.0 reference, but is not defined as a strict tag.) Using inline frames to represent portlets is useful since all the frames are accessible from the browser's Document Object Model (DOM). This allows JavaScript to be used to manipulate contents and actions of each and every inline frame in a browser window (subject to security constraints of the browser and the contents of the frame).

Figure 5A:
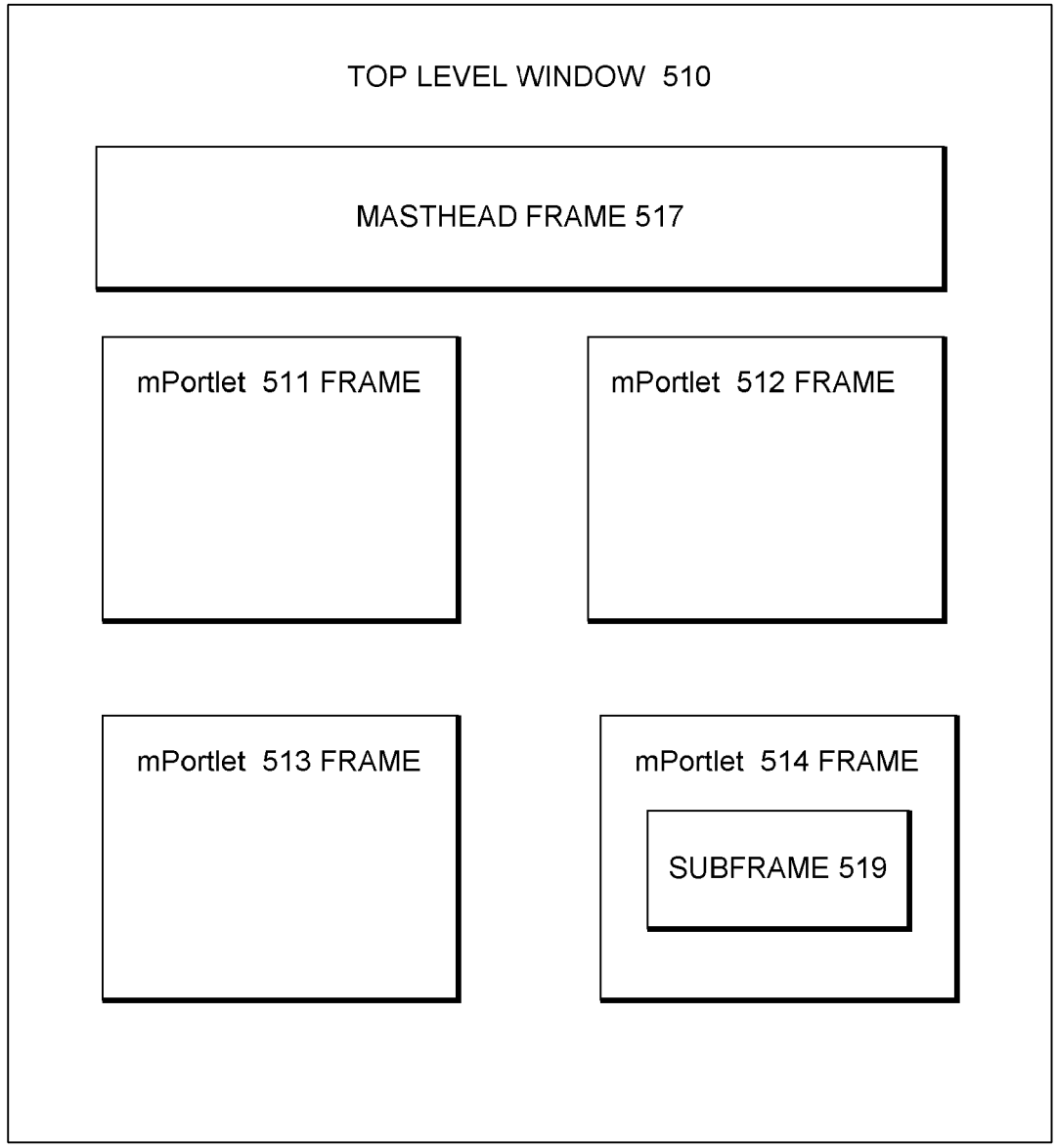
FIG. 5A is a block diagram of a Web page in a browser window illustrating the structure of a Web page including four portlets in separate frames, and a masthead frame.

Web pages that contain inline frames have a known hierarchy of frame organization. Each inline frame, or child frame, can reference its parent frame directly in its own JavaScript, using the parent object. Likewise, the parent frame's JavaScript can reference the contents of the Document Object Model (DOM) within a child frame. FIG. 5A is a block diagram of a Web page in a browser window illustrating the structure of a Web page including four portlets in separate frames 511, 512, 513, 514 and a masthead frame 517. Frames can be embedded within other frames to create additional levels of hierarchy. As shown, a sub-frame 519 is embedded in frame 514. However, references to each frame's "parent"

object in turn will eventually give a reference to the outermost browser window, the top level frame 510 as illustrated at FIG. 5A.

Listeners and Actioners

Messaging portlets have been designed so that there are no dependencies between individual mPortlets. When portlets are designated as messaging portlets they continue to operate in the same manner as they would if they were not designated as messaging portlets. In object oriented programming parlance, messaging portlets must be decoupled from each other while continuing to provide inter-portlet communication. This is a powerful feature because it allows mPortlets to be added to a page based on user choice and personalization rather than forcing the user to use a fixed set of tightly coupled portlets.

Figure 5B:
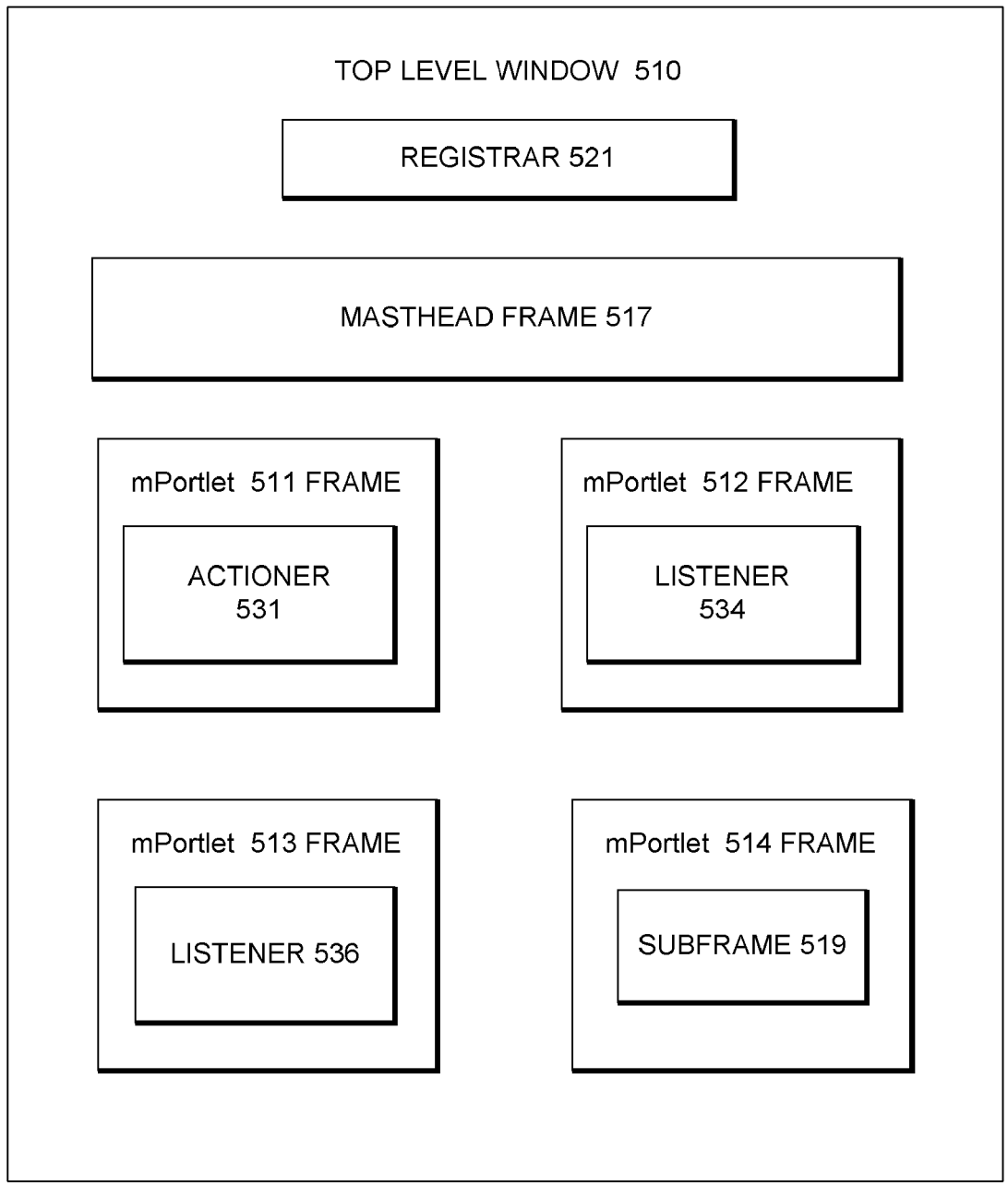
FIG. 5B is a block diagram illustrating the same browser window previously depicted at FIG. 5A augmented to illustrate the inclusion of messaging portlets.

This decoupling of mPortlets is achieved by utilizing a central registration point for all mPortlets. In the currently preferred embodiment, the topmost browser window (as shown at FIG. 5A) is used as this central registration point as the topmost browser window is a part of the Web page that is guaranteed to be always available, populated and accessible. Also a distinction must now be made between the different functions in messaging portlets. When an mPortlet is expected to receive information that it is to then process, it is called a listener. When an mPortlet is expected to send information to be processed by other mPortlets, it is called an actioner. Since listeners are the targets, they must register with a central controller, or registrar. The registrar is not a type of messaging portlet; rather, it is a central function that ties together messaging portlets. FIG. 5B illustrates the same browser window previously depicted at FIG. 5A augmented to illustrate the inclusion of messaging portlets. The items added to the browser window include a registrar 521, an actioner 531 and two listeners 534 and 536. As shown at FIG. 5B, the registrar is in the top-level window, while the actioner 531 is in frame 511, the first listener 534 is in frame 512, and the second listener 536 is in frame 513.

When the registrar 521 receives a notification from an actioner (e.g., actioner 531), it looks up the registered listeners (e.g., listeners 534, 536) and notifies each of them in turn. There is no necessity to register actioners with the registrar, since an actioner is not the target for the action it provides. However, it may be possible that an actioner is also listener for other pieces of information.

It should be noted that the registrar 521 does not directly affect the contents of the target portlets. Instead, the registrar passes a notification into the listener frame of the target. This is an important consideration that is necessary to cleanly decouple portlets. The registrar's job is only to register and notify. The actioner is responsible for packaging up the notification data and passing the notification event to the registrar. It is the responsibility of the listener to register and then process the notification.

In the currently preferred embodiment, the binding of a notification event to a listener's registration is done using a string value. When a listener registers with the registrar, the listener identifies a string value. When an actioner notifies the registrar it uses a string value. The string value is used to check each registration. The string value provided by the actioner is compared to the value of registered listeners. If the value matches a registered listener, then that listener is notified. There may be multiple registrations for each frame; however, each registration is generally associated with a different registration string value.

JavaScript Functions

In the presently preferred embodiment, the implementation of the registrars, the actioners, and the listeners relies on the use of generalized JavaScript code. To keep the design as simple and elegant as possible, the same set of JavaScript functions are declared in the topmost window and also used for the registrar as well as for the actioners and listeners in the messaging portlets. The following discussion assumes that the target of a notification is a HTML FORM text field. This is consistent with how the system of the currently preferred embodiment represents portlet parameters to the user.

The following are the public function declarations in the JavaScript of the currently preferred embodiment:

Register(targetframe, form, parameter, registeras): The "Register" function is used by a listener to register itself. The "targetframe" is used by the registrar when it needs to pass notifications to this frame. The "form" and "parameter" values identify a HTML FORM field that is the target for the data involved in the notification. The "registeras" field is the unique string against which this registration is associated.

UnRegister(targetframe, form, parameter, registeras): The "UnRegister" function is used by listeners to delete a previously made registration. This provides the opportunity for a frame to optionally turn on and off its ability to receive notifications from the registrar.

Notify(srcframe, notifyas, value) and NotifyAll(srcframe, notifyas, value): The "Notify" and "NotifyAll" functions are used by actioners to initiate a notification event. The "srcframe" value is not used by the registrar, but included for completeness. The "notifyas" value is used by the registrar to compare against the "registeredas" values for each registered listener. The value is the data associated with the notification. The difference between the Notify and the NotifyAll functions is that the Notify function will pass the notification only to the first registered listener associated with the "notifyas" value (i.e., the order of registrations is not guaranteed). The NotifyAll function passes the notification to all registered listeners associated with the "notifyas" function.

NotifyThis(form, parameter, value): The "NotifyThis" function is used by the registrar when a match is made between a notification and a listener. In the current implementation the target is assumed to be a HTML FORM field, that is a text field or a hidden field.

A local variable is used to differentiate between the registrar and the inner frames in the presently preferred embodiment. Although the same variable is declared in multiple places within the JavaScript, the inner frame declarations over-ride the topmost declaration for the scope of that frame, thus ensuring calls in the frame are performed correctly. To ensure that frame hierarchy is always maintained (even for inner frames, and sub-frames of inner frames, and so forth) the function is only executed when the local variable indicates it is the top-most frame. Otherwise, it passes the execution to the equivalent function of its parent(s). For example, the "Register" function contains the following code segment:

```
1: if (!amTopFrameset) {
2:     parent.Register(targetframe,form,parameter,registeras
);
3: }
4: ...
```

Similarly, the "NotifyAll" function contains the following code segment (with similar code in the Notify function):

```
1: if (!amTopFrame) {
2:     parent.NotifyAll(srcframe,notifyas,value);
3: }
4: ...
```

As illustrated in the above code segments, the frame hierarchy is maintained by only executing functions of a given frame when the local variable indicates it is the top-most frame.

JSP Reference Generators

Once the JavaScript has been declared within a frame, the next step is to create the appropriate references and calls to automatically register the appropriate listeners and provide the "hot spots" for the actioner frame. It should be noted that this discussion uses as an example an implementation that is oriented towards custom JSP-type (Java server page-type) frames that are not contained within a portal interface presentation. This is for the purposes of illustrating the design and operations of messaging portlets and should not be construed to indicate that present invention may only be used in this context.

A JSP Reference Generator is a fragment of Java server page (JSP) code that takes input parameters and subsequently generates the HTML code that calls the appropriate JavaScript functions as necessary. The currently preferred embodiment of the present invention includes JSP Reference generators for the following:

Actioner based on fixed source values (using NotifyAll).

Actioner based on a value sourced from a HTML FORM text or hidden field (using NotifyAll).

Listener based on a target value in a HTML FORM text or hidden field.

For example, the following illustrates a JSP code fragment which can be used to generate the appropriate HTML containing a link that is used to action a notification:

```
1: <jsp:include page="ClickAcross-Actioner-FixedValue.jsp">
2:     <jsp:param name="notifyas" value="Stock"/>
3:     <jsp:param name="value" value="IBM"/>
4: </jsp:include>
```

The above JSP code fragment for an actioner generates the following HTML code:

```
1: <a href="" onClick="NotifyAll(thisFrame, 'Stock', 'IBM');
return
false;">
2: <img src="images/action_icon.gif" border=0></a>
```

Likewise for a listener, the following JSP code fragment is included in the target frame source:

```
1: <jsp:include page="ClickAcross-Listener-FormTextField.jsp">
2:     <jsp:param name="form" value="TargetForm"/>
3:     <jsp:param name="parameter" value="ParamA"/>
4:     <jsp:param name="registeras" value="Stock"/>
5: </jsp:include>
```

The above JSP code fragment for a listener generates the following HTML code:

```
1: <script>
2:     Register(thisFrame, 'TargetForm', 'ParamB', 'Location');
3: </script>
4: <table>
5: <tr>
6: <td><INPUT TYPE="radio" name="NotifyLocation" value ="1"
checked
onClick="Register(thisFrame, 'TargetForm', 'ParamB',
'Location');">On
<INPUT TYPE="radio" name="NotifyLocation"
value="0" onClick="UnRegister(thisFrame, 'TargetForm', 'ParamB',
'Location');">Off
7: </td>
8: </tr>
9: </table>
```

The currently preferred approach of providing JSP Reference Generators is one that allows JSP programmers to easily incorporate messaging portlet elements in their applications. Although there are only a few types of JSP Reference Generators they can be easily written to allow for a number of different types of actioner source values. To implement different types of listener targets it may be required to extend the JavaScript functions to allow for different types of HTML FORM-based registrations. For example, to assign a value to HTML FORM radio button requires a small amount of additional code in the JavaScript functions.

Example of Web Application Based on Messaging Portlets

To illustrate the flexibility of the design and methodology the present invention, the following discussion describes a small Web application that is based on the use of messaging portlets. In this example, the Web application is built using three messaging portlets that can cooperate based on the dynamic content they contain. These three portlets are as follows:

Symbol List Portlet: The Symbol List Portlet is an aggregated mPortlet built from a single XML element that makes a call to a URL (which happens to be a Java server page) that reads a database table for a list of company stock symbols. The resulting XML is transformed into HTML using a XSL transformation based on a defined XSL template. The XSL transformation forms a HTML table with a separate row for each different company stock symbol.

Address Portlet: The Address Portlet is another aggregated mPortlet built from a single XML element. However the Address Portlet uses a single parameter value in the URL to parameterize the company stock symbol that is used to read the company's address from the same database. Another XSL transformation defined as an XML Template is used to display the address as a set of HTML FORM text entry fields. The address includes a Post Code (or zip code) field.

Map Portlet: The Map Portlet is an aggregated Portlet built from a single Web element. The Web element is a capture of the map sourced from a Post Code entry. Only the Map graphic and some of the map controls have been captured from the original page. The Post Code has been registered as the required entry parameter for this Map Portlet.

Conceptually, each of these three portlets performs a discrete function. However, when defined as messaging portlets they can work together to relate the information that each is presenting with information presented by the other messaging portlets. For example, the Symbol List Portlet, when implemented as a messaging portlet, may be defined to represent an actioner which creates a notification event based on the click of an actioner icon (or hot spot) that is associated with each company stock symbol. The Address Portlet represents both a listener and an actioner. The Address Portlet registers for the notification of a stock symbol event type and re-posts its own HTML FORM to re-populate the portlet's address information based on the stock symbol received from the notification. The actioner of the Address Portlet creates a notification event based on the click of an actioner icon (or hot spot) associated with the Post Code (or zip code) field. The Map Portlet represents a listener which is registered to receive notification of a Post Code event type. When a Post Code event type occurs, the Map Portlet re-posts its own HTML FORM to re-populate the map information based on the Post Code received from the notification.

Configuration of Messaging Portlets

The configuration of the above-described messaging portlets relies on the ability to define additional HTML and XSL Templates. A HTML Template acts as a container for a messaging portlet and contains references to the individual elements that make up the portlet. To represent a portlet as a messaging portlet requires the addition of calls into the above-described "Register" and "NotifyAll" JavaScript functions for the required elements on that page. In an alternative embodiment, the portlet automatically registers and provides notification icons (hot spots) and/or links based on values that can be assigned directly in forms provided by the system. However, HTML Templates may also be used for housing portlets and trans-forming them from standalone portlets into messaging portlets.

For example, the standalone portlet for the above-described Symbol List Portlet can be defined against a standard one row by one column (1×1) portlet template. However, for a messaging portlet a custom user interface XSL is created so that it outputs an actioner icon (hot spot) for each company symbol returned. The user interface XSL for a sample Symbol List Portlet is shown below:

```
1: SymbolList XSL Template:
2: <?xml version="1.0"?>
3: <xsl:stylesheet xmlns:xsl="http://www.w3.org/1999/XSL/
Transform"
version="1.0">
4: <xsl:template match="SymbolList">
5:   <TABLE WIDTH="100%">
6: <xsl:for-each select="//Company">
7:   <TR>
8:     <TD width="50%" align="right">
9:       <xsl:value-of select="Exchange"/>.<xsl:value-of
select="Symbol"/>
10:     </TD>
11:    <TD width="50%" align="left">
12:     <a>
13:      <xsl:attribute name="href"><xsl:text>/clickacross/
database/
GetSymbolList</xsl:text></xsl:attribute>
14:      <xsl:attribute name="onClick"><xsl:text>NotifyAll
(self.name,
'symbol',
'</xsl:text><xsl:value-of select="Symbol"/><xsl:text>');
return false;</xsl:text></xsl:attribute>
15:      <img src="http://msw-k2.sybase.com:4040/clickacross/
images/action_icon.gif" border="0"/>
16:     </a>
17:    </TD>
18:   </TR>
19: </xsl:for-each>
20:   </TABLE>
21: </xsl:template>
22: </xsl:stylesheet>
```

The actioner "hot spot" code which provides for sending a message in response to a user selecting (e.g., clicking on) the hot spot (actioner) is shown above at lines 12-16.

The example Address Portlet is also enclosed in a one column by one row (1×1) HTML Template. The HTML Template code for this sample Address Portlet is shown below:

```
1: Address 1-1 HTML Template:
2: <STYLE TYPE="text/css">
3: .gridRowHeader {background:#D3E3FC;padding:4px;
padding-bottom:0px;border:1px solid #FFF;font-size:13px;
font-family:verdana;font-weight:bold;}
4: .gridRowA {background:#C4CEDF;padding:4px;
padding-bottom:0px;border:1px solid #FFF;font-size:13px;
font-family:verdana;}
5: .gridRowB {background:#FFFFFF;padding:4px;
padding-bottom:0px;border:1px solid #FFF;font-size:13px;
font-family:verdana;}
6: </STYLE>
7: <table>
8: <tr>
9: <td width=100%>
10: <a href="" onClick="NotifyAll(self.name, 'postcode',
document.address.postcode.value); return false;"><img
src="/PortletFarm/images/action_icon.gif" border=0></a>
11: </td>
12: </tr>
13: <tr>
14: <td width=100%>
15: <script>
16:    var amTopFrameset = false;
17:    Register(self.name, 'personalizeForm'+doGetWindowId( ),
'null?null&&symbol&&'+doGetWindowId( ), 'symbol');
18: </script>
19: </td>
20: </tr>
21: <tr>
22: <td width=100%>
23: Receive: <INPUT TYPE="radio" name="Notifysymbol" value="1"
checked
onClick="Register(self.name, 'personalizeForm'+doGetWindowId( ),
'null?null&&symbol&&'+doGetWindowId( ), 'symbol');">On
<INPUT
TYPE="radio" name="Notifysymbol" value="0" onClick="Un
Register
(self.name, 'personalizeForm'+doGetWindowId( ),
'null?null&&symbol&&'+doGetWindowId( ), 'symbol');">Off
24: </td>
25: </tr>
26: </table>
27: <table width="100%" cellspacing="0" cellpadding="0">
28: <tr align="center" valign="middle">
29: <td height="10"><OPContent id="0" name="Content" /></td>
30: </tr>
31: </table>
```

This above HTML Template is the same as the original standard 1×1 HTML portlet except for the addition of the definitions of the listener for the "symbol" notification and for the creation of an actioner icon (hot spot) that actions the Post Code notification at lines 7-26 above.

As shown above at lines 17 and 23, the JavaScript in the above HTML references a FORM named "personalizeFormNNNN" where "NNNN" is the identifier (ID) of the portlet. To obtain the ID of a portlet, a portal interface JavaScript function is used that is available from the page called "doGetWindowid( )". Similarly, at lines 17 and 23 the JavaScript references a FORM text field called "null?null&&symbol&&NNNN" where "NNNN" is again the ID of the portlet. The name of the FORM text field was derived by viewing the HTML source of the portlet in a pre-view prior to assigning the portlet to the new template.

The Register function can also be modified to automatically discover both the FORM name and the name of input parameters so that this manual process of previewing the portlet is not required.

The below example Map Portlet is also housed in another custom one column by one row (1×1) HTML Template. The HTML Template code for this sample Map Portlet is shown below:

```
 1: YahooMap 1-1 HTML Template:
 2: <STYLE TYPE="text/css">
 3: .gridRowHeader {background:#D3E3FC;padding:4px;
    padding-bottom:0px;border:1px solid #FFF;font-size:13px;
    font-family:verdana;font-weight:bold;}
 4: .gridRowA {background:#C4CEDF;padding:4px;
    padding-bottom:0px;border:1px solid #FFF;font-size:13px;
    font-family:verdana;}
 5: .gridRowB {background:#FFFFFF;padding:4px;
    padding-bottom:0px;border:1px solid #FFF;font-size:13px;
    font-family:verdana;}
 6: </STYLE>
 7: <table width="100%" cellspacing="0" cellpadding="0">
 8: <tr>
 9: <td width=100%>
10: <script language="Javascript">
11: var amTopFrameset = false;
12:   Register(self.name, 'personalizeForm'+doGetWindowId( ),
    'null?null&&csz&&'+doGetWindowId( ), 'postcode');
13: </script>
14: </td>
15: </tr>
16: <tr>
17: <td width=100%>
18: Receive: <INPUT TYPE="radio" name="Notifysymbol" value="1"
    checked
    onClick="Register(self.name, 'personalizeForm'+doGetWindowId( ),
    'null?null&&csz&&'+doGetWindowId( ), 'postcode');">On <INPUT
    TYPE="radio" name="Notifysymbol" value="0"
    onClick="UnRegister(self.name, 'personalizeForm'+doGet
    WindowId( ),
    'null?null&&csz&&'+doGetWindowId( ), 'postcode');">Off
19: </td>
20: </tr>
21: </table>
22: <table width="100%" cellspacing="0" cellpadding="0">
23: <tr align="center" valign="middle">
24: <td height="10"><OPContent id="0" name="Content" /></td>
25: </tr>
26: </table>
```

This template is also the same as the original standard 1×1 HTML portlet except for the addition of the definitions of the listener for the "Post Code" notification shown at lines 7-21 above.

The FORM text field, the portlet's input parameter, was derived from a preview of the portlet prior to assigning it this new HTML Template as described above. In this case it is called "null?null&&csz&&NNNN" as provided above at lines 12 and 18.

Example of Click Across Portlets

Figure 6:
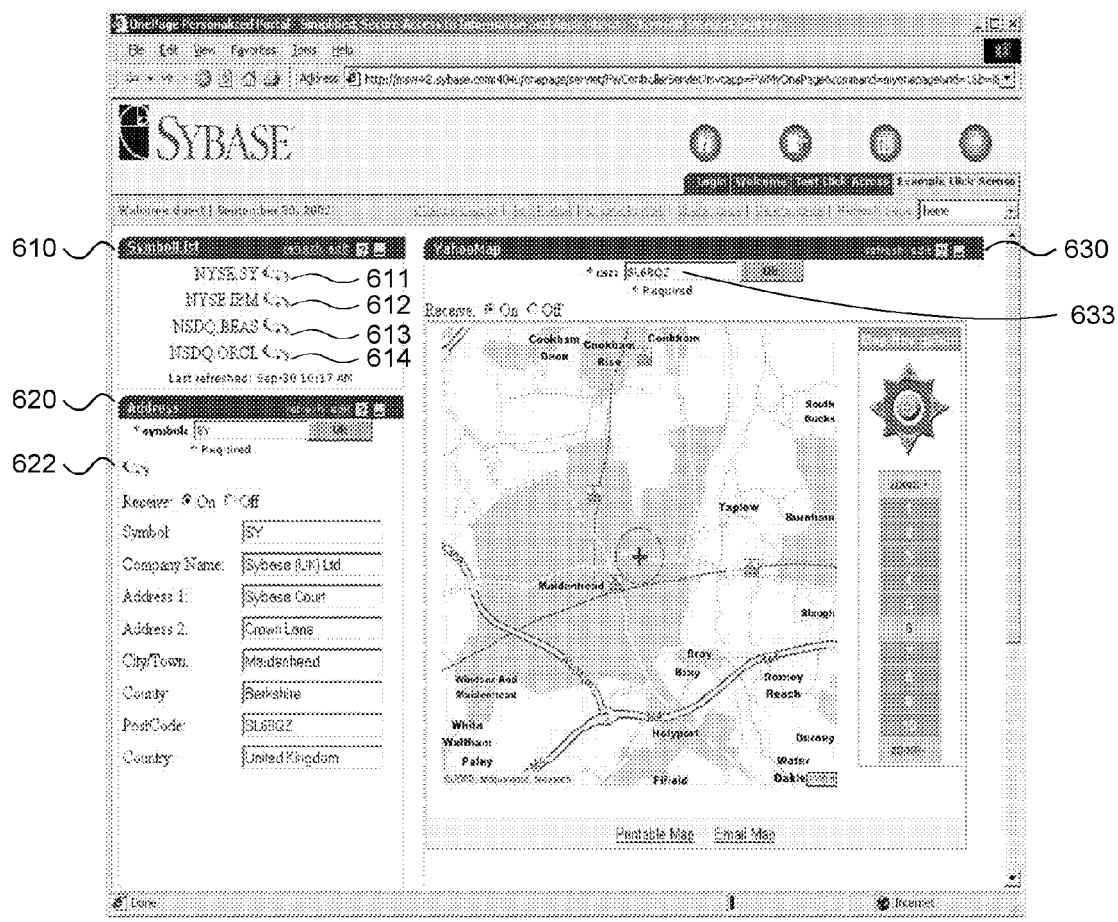
FIG. 6 is an example of a "click across" page containing the previously-described Symbol List, Address, and Map messaging portlets.

FIG. 6 is an example of a "click across" page 600 containing the Symbol List, Address, and Map messaging portlets described above. As shown, the Symbol List mPortlet 610, the Address mPortlet 620, and the Map mPortlet 630 are placed on the same page and interact with each other as described below. In the example shown at FIG. 6, the three messaging portlets 610, 620, 630 are included in a portal interface guest page as presented to the user in one embodiment of the present invention.

As shown at FIG. 6, actioner "hot spots" (icons) 611, 612, 613, and 614 are shown on the Symbol List mPortlet 610 against each market symbol. These actioner hot spots 611-614 each create a notification event passing the associated symbol when selected by the user. In this case the Address mPortlet 620 is registered as a listener for this type of notification. As the user has selected the first symbol on the list, the address of this company is retrieved and displayed by the Address mPortlet 620. The Address mPortlet 620 also includes an actioner "hot spot" (icon) 622 which is associated with the Post Code form value. By selecting this actioner, the Map mPortlet 630 is refreshed to display a map based the selected Post Code (United Kingdom code equivalent to United States zip code).

The user can also "Click-Across" from the Symbol List mPortlet 620 to cause different address information to be displayed in the Address mPortlet. For example if the user clicked on the action 612 associated with the symbol "IBM", the symbol "IBM" is sent by the Symbol List mPortlet 610 to the Address mPortlet 620. In other words, the symbol associated with the actioner hot spot 612 is assigned to the Address symbol parameter, and the Address mPortlet 620 is then automatically refreshed based on the new parameter. As a result the address of the company associated with the selected symbol would be displayed in the Address mPortlet 620.

The user can also "Click-Across" from the Address mPortlet 620 to the Map mPortlet 630 in a similar fashion. Selecting the actioner "hot spot" 622 assigns the Post Code associated with the actioner hot spot to the "csz" parameter 633 of the Map mPortlet 630. The Map mPortlet 630 is then automatically refreshed based on the new csz parameter to display a map centered on this Post Code.

The flexibility of the design of the system of the present invention means that other messaging portlets that listen for the same notification may also be easily added to a page (e.g., page 600). Other mPortlets that were added to the page can also refresh themselves in response to a Click-Across action in a similar fashion. For example, a Stock Price messaging portlet could be added to listen for the symbol notification from the Symbol List mPortlet. In this case when a Symbol List mPortlet actioner is clicked it would refresh both the Address mPortlet and the Stock Price mPortlet with the new symbol and content based on that symbol would be displayed in both of these mPortlets.

Creation of Messaging Portlets

The currently preferred embodiment of the present invention provides an interactive "mElement" wizard (development tool) that can be used to create messaging portlets that will exchange (send and/or receive) messages with other elements (portlets). For example, a Web application that is being constructed may include a Symbol List portlet, an Address portlet, and a Map portlet similar to those previously described above in this document. By adding "interactive broadcast" and "interactive listener" JavaScript routines to these three portlets in accordance with the teaching of the present invention, messaging portlets can be created for sending messages from one portlet (or element) that will trigger action in one or more other portlets (or elements). This enables a user to easily create interactive Web applications that provide powerful functionality based on the system and methodology of the present invention which provides for dynamically matching, labeling, and acting on these messages.

The following discussion describes how existing portlets or "elements" can be converted into messaging portlets or elements (i.e., mPortlets). The following discussion uses the example of the conversion of a Web element or portlet into a messaging portlet. However, the methodology of the present invention may also be used in conjunction with other elements or portlets, including database elements and XML elements.

Web portlets (sometimes referred to in the following discussion as "elements") created with a content capture workbench provided by the system of the currently preferred embodiment can be converted into a messaging portlet (sometimes referred to below as an "mElement") by selecting the desired element and then selecting "mElement" from the pop-up menu displayed with a right-mouse click. The messaging element wizard provided in the currently preferred embodiment of the system provides a "wizard page" enabling a user (e.g., developer or other knowledge worker) to preview the desired element and select from a number of messaging strategies to add actions to the element. In many cases the selection of the desired messaging strategy is obvious. However, it is possible to have a single element that contains several different combinations of anchors, tables, and forms. In this event, the user will need to consider the action desired and apply the appropriate strategy. Current messaging element strategies supported in the currently preferred embodiment of the present invention include the following:

"Anchor" objects. An anchor object displayed in the wizard page may be used to add messaging element actions to Web anchors and links within an element.

"Grid" objects. A grid object displayed in the wizard page can be used to add messaging element actions to Web objects with "column and row" formatting. These elements are usually the result of a grid capture that has been modified with "grid rule" formatting.

"Form" objects such as Web "FORM" tags. These objects can be captured using a "CELL" capture strategy or a "FORM" strategy in the Web capture workbench provided by the system of the currently preferred embodiment.

"Database" objects for elements that have been created using a database capture strategy.

"Custom" objects that are unique to a particular installation.

Using the wizard, the user may select the desired messaging element strategy and then click on the "Next" button to continue the creation of a new messaging element (mPortlet).

After the user selects the "Next" button, he or she may continue implementing one of the following mElement messaging strategies currently supported in the system of the present invention:

Link/Anchor Action Message Strategies. A Link/Anchor page is provided which includes the following three features: a "preview area" displays a view of the original content with additional icons to indicate what message actions are being added; an "Assign Message Actions" table allows the user to define message actions with a pop-up menu and to assign output message names; and an "action icon" (e.g., a red check mark icon) which is displayed next to message elements that are "active" and ready to send messages. Using the action icon allows the original anchor link to remain working within the element.

In operation, clicking on the anchor and the link of a given element behaves as if there are no messaging actions within (or associated with) the given element. However, when the "action icon" is selected, the message containing the text of the link and the output message name is sent to the messaging element's container and then broadcast to all other listening elements.

The "Assign Message Action" table's pop-up menu currently has the following menu items and actions:

No Action: The link has no messaging actions.

Send: Send this link and output message when the "action icon" (e.g., check mark icon) is selected (e.g., clicked on).

Send All: Enable all links in the element for action so that each link will have an "action icon" icon and output message.

Clear: Clear all messaging actions from this element.

Test: Bring all JavaScript code into the preview window.

When messaging actions have been associated with messaging elements (mPortlets), a user may select a "Finish" button on the wizard. Upon pressing Finish, if a messaging element (mPortlet) is actionized, an "action icon" (e.g., a red check mark icon) is visible in the editor's preview page.

Web Application Wizard

The system of the currently preferred embodiment also provides a "Web Application Builder" tool that can be used to create Web applications using a frameset to contain multiple elements. Web applications provide a container (i.e., mContainer) for messaging elements that communicate with each other. Elements (portlets) captured from different sources with varying strategies can be made to communicate with each other using the above-described messaging element wizard and then combined using the Web Application Builder to create applications that provide rich functionality. The Web Application Builder also allows users to select from different pre-defined frame layouts to design their Web application.

The following discussion describes how a Web application can be constructed using the Web Application Builder tool or wizard. This discussion assumes that all of the elements (mPortlets) that are to be used as part of the Web application using the Web Application Builder wizard must have already been created.

In the system of the currently preferred embodiment, the Web Application Builder wizard can be started by selecting a "Web Application Builder" icon from the toolbar. The wizard can also be opened by selecting an "Open New Wizard" icon from the toolbar and then selecting "Content Development" and "WebApp Builder" from a dialog box. Alternatively, a user can select a "WebApp Builder" menu item from a Content Capture Workbench menu provided by the system. After the wizard is started, a user can select a frame layout for the Web application (e.g., by choosing an icon of a particular type of frame layout from a menu of choices and pressing a "Next" button in the wizard).

Depending on the layout selected, the user may then need to select the number of elements. For example, a 3-frame layout will require 3 elements to be selected. Currently, elements may be selected by highlighting a project name to view the contents on a right-hand window pane. Pressing a checkbox next to the project name selects all the elements by default but it does not make the elements viewable. An indication is provided when all of the elements have been selected within a project. Elements may be deselected by pressing "Deselect All". In the currently preferred embodiment, the exact number of elements required for the frame layout must be selected before the wizard allows the user to continue.

After the necessary elements have been selected, a "preview" pane contains an outline of how the elements will be displayed once the Web application is completed. The positioning of the elements can be altered by mapping the frame name to the name of the element. Drop down menus allow the option to choose another location for the element. The preview pane may be referenced to find out the mapping schema for the element numbers for a particular frame layout. The preview pane also reflects any changes made to the positioning of the elements. A user can also select a "Preview Content" option to view the Web application using the actual elements (including their contents). The completed application can then be saved. In the currently preferred embodiment a "save" page is provided which enables a user to save the elements and place them in the project of their choice. The operations of the system of the present invention will next be described in greater detail.

DETAILED OPERATION

Overview of Basic Methodology

Figure 7:
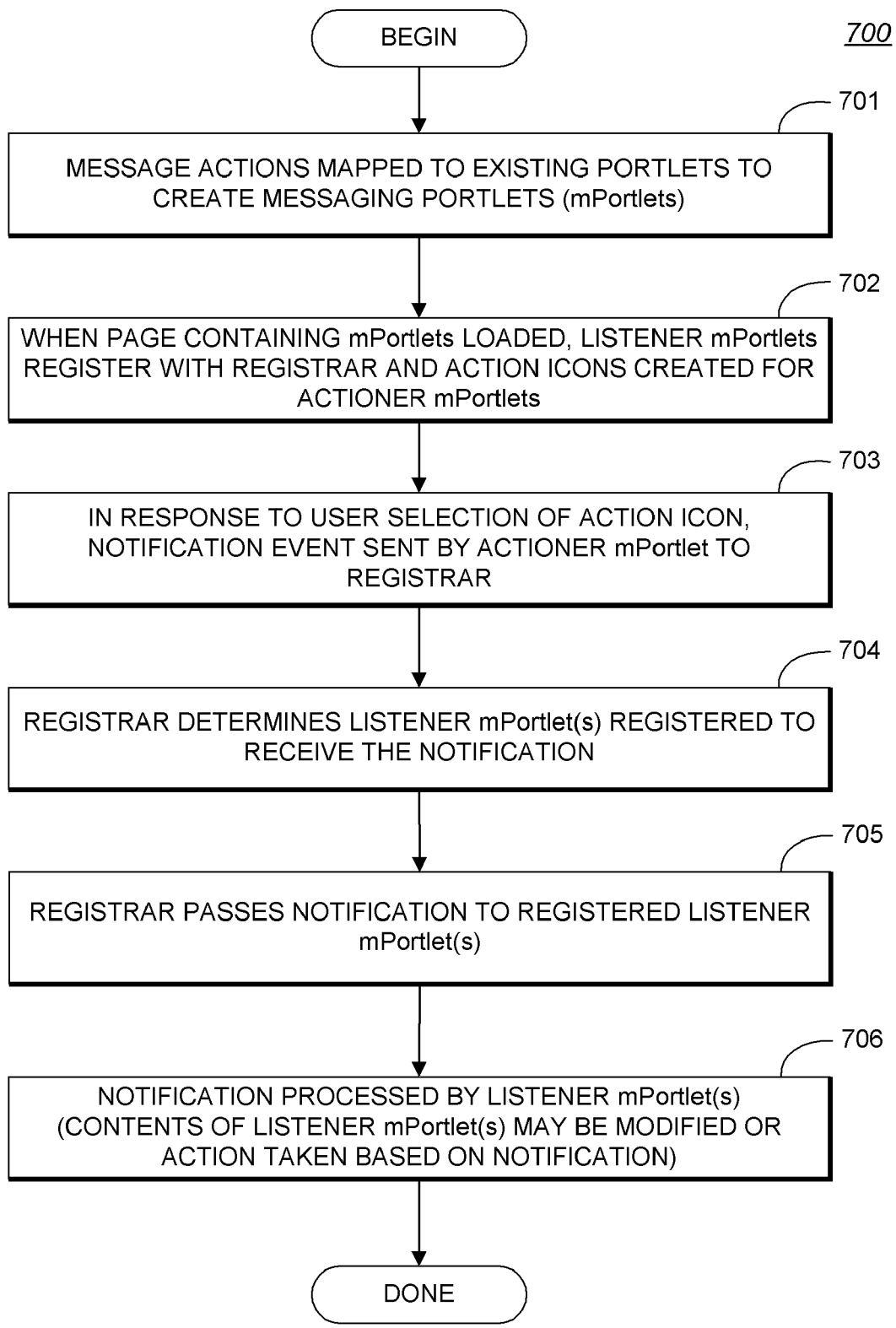
FIG. 7 is a high-level flowchart illustrating the methods of operation of the system of the present invention in dynamic collection and forwarding of information among messaging portlets enabling such mPortlets to process information, modify their contents, and/or take action based on information received from another mPortlet.

FIG. 7 is a high-level flowchart 700 illustrating the methods of operation of the system of the present invention in dynamic collection and forwarding of information among messaging portlets enabling such mPortlets to process information, modify their contents, and/or take action based on information received from another mPortlet. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for down-loading and installation from an Internet location (e.g., Web server).

The following discussion uses as an example the conversion of one or more portlets in an existing static portal into interactive messaging portlets. The process begins at step 701 with the mapping of message actions to one or more existing portlets. For example, a messaging element wizard provided in the currently preferred embodiment of the present invention may be used to preview the portlets to be converted to mPortlets and to select and add messaging actions to these portlets (e.g., adding "action icons" to "actioner" mPortlets that may be selected to cause actions to occur in one or more "listener" mPortlets).

A messaging container (mContainer) is typically created as a container for the mPortlet and the mContainer and mPortlets are implemented (e.g., as part of a content management application or other Web application). As a Web page containing the mContainer and mPortlets is loaded (e.g., in a browser on a client device), at step 702 the listener mPortlets register with the registrar and the action icons or "hot spots" are generated and displayed to "actionize" the actioner mPortlets.

A user may then select (e.g., click on) a particular action icon of an actioner mPortlet. In response to a user selecting a particular action icon of an actioner mPortlet, at step 703 the actioner mPortlet sends a message (notification event) to the registrar. For example, a messaging portlet may be defined to represent an actioner which creates a notification event based on the click of an actioner icon (or hot spot) that is associated with a company stock symbol. When the actioner icon is selected, the actioner mPortlet packages up the notification data (e.g., information about the company having the stock symbol) and passes the notification event to the registrar.

When the registrar receives a notification event from an actioner mPortlet, at step 704 the registrar looks up the registered listener mPortlets that registered to receive this notification. In the currently preferred embodiment, the binding of a notification event to a listener's registration is done using a string value. When a listener registers with the registrar, the listener identifies a string value. When an actioner issues a notification event to the registrar it also includes a string value. The string value provided by the actioner is compared to the value of registered listeners. At step 705, the registrar notifies each of the registered listeners (i.e., those with matching values) by passing a notification into the listener frame of each registered listener mPortlet. At step 706, the notification is processed by the registered listener mPortlet(s). For example, an address of the company having the stock symbol may be retrieved and displayed in a listener mPortlet in response to the selection of an actioner associated with the stock symbol in an actioner mPortlet.

mPortlet.html Loaded into a Hidden Frame of the Container Portlet

Figure 8:
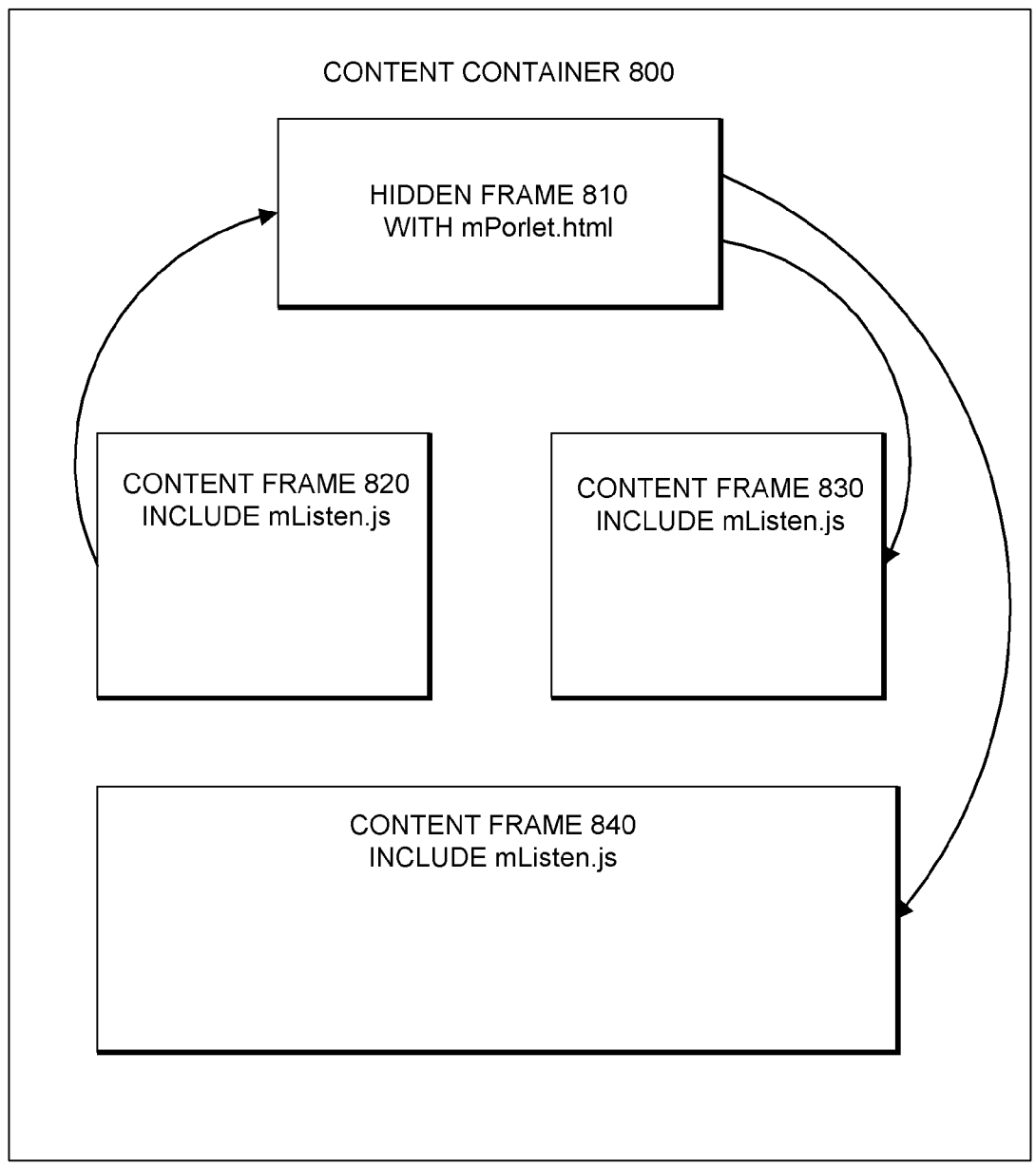
FIG. 8 is a diagram showing a "content container" divided into individual frames.

The currently preferred embodiment of the present invention utilizes two code libraries to pass messages between the messaging portlet elements. FIG. 8 is a diagram showing a "content container" divided into 4 individual frames. As shown at FIG. 8, the content container 800 includes a hidden frame 810 and three content frames 820, 830, and 840. As also shown, a message sent from content frame 820 is received by the hidden frame 810. The hidden frame 810 then sends messages to content frame 830 and content frame 840.

The hidden frame 810 shown at the top of the content container 800 includes the previously-described registrar functionality. More particularly, in the currently preferred embodiment the hidden frame 810 contains the below "mPortlet.html" Javascript code:

```
1: <HTML>
2: <SCRIPT LANGUAGE="javascript">
3: maxFrames = 10;
4: function makeFrameArray( size )
5: {
6:   this.length = size;
7:   for (var i = 1;i <= size; i++)
8:     this[i] = null;
9:   return this;
10: }
11: var myframes = new makeFrameArray(maxFrames);
12:
13: function showAlert( ){
14:   alert("Executing from test.js");
15: }
16:
17: function registerListener(theFrameName)
18: {
19:
20: for (var i = 1;i <= myframes.length; i++)
21: {
22: if (myframes[i] == null)
23:    {
24:    myframes[i] = theFrameName;
25:    i = 1000;
26:    }
27: }
28: //var winalert = window.open("","TestWindow","directories=no,location=no,
menubar=no,status=no,titlebar=no,toolbar=no,width=400,
height=150,resizeable=no");
29: //winalert.document.write("<head><title>mPortlets Messages</title></head><b>Register Frame as: </b>" + theFrameName + " </HTML>");
30: }
31: function sendMsg(theMsg)
32: {
33: // alert(theMsg);
34: for (var i = 1;i <= myframes.length; i++)
35: {
36: if (myframes[i] != null)
37:    {
38:
39:    theFrame = "parent." + myframes[i] + ".msgListen(theMsg)";
40:    // alert(theFrame);
41:    eval(theFrame);
42:    }
43:
44: }
```

-continued

```
45: }
46: </script>
47: </html>
```

The above "mPortlet.html" has the responsibility to wait for "registration" of each of the content portlets and to send any messages received from a content portlet to each of the "listening" portlets registered to receive such messages.

mListen.js File Included with Each Content Element

As also shown at FIG. 8, content frames 820, 830, and 840 in the content container (page) 800 include the following "mListen.js" file which will cause each such content frame to register with the mPortlet.html of the hidden frame 810 when the page loads in the browser:

```
 1: function sendFormMsg( )
 2: {
 3:    var fieldValue = "";
 4:    var fieldName = "";
 5:    var outName = "";
 6:    var msgIndex = 0;
 7:    for (var i=0;i < acts.length;i++)
 8:    {
 9:       var c = acts.charAt(i);
10:       if (c != "z")
11:       {
12:          fieldName = document.forms[0].elements[i].name;
13:          fieldValue = document.forms[0].elements[i].value;
14:
15:          outName = msgOutNames[msgIndex++];
16:          alert("got to sendFormMsg " + outName + " " + fieldValue);
17:
18:       }
19:    }
20: }
21: function msgListen(theMsg)
22: {
23:    var theInputString = "" + theMsg;
24:    var beginFieldMsgLength = 0;
25:    var theNameMsgLength = 0;
26:    var nameBeginIndex = 0;
27:    var fieldValue = "";
28:    var fieldName = "";
29:    var thisField = "";
30:
31:    while (theNameMsgLength != -1)
32:    {
33:       theFieldMsgLength = theInputString.indexOf('|',beginFieldMsgLength+1);
34:       if (theFieldMsgLength == -1) theFieldMsgLength = theInputString.length; // last field in message
35:       thisField = theInput-String.substr(beginFieldMsgLength,theFieldMsgLength);
36:       theNameMsgLength = thisField.indexOf("=");
37:       if (theNameMsgLength > 0)
38:       {
39:          theNameMsgLength = theNameMsgLength - nameBeginIndex;
40:          fieldName = thisField.substr(nameBeginIndex,theNameMsgLength);
41:          fieldName = trim(fieldName);
42:          fieldValue = thisField.substr(theNameMsgLength+nameBeginIndex+1, theFieldMsgLength);
43:
44:          if (eval("self.document.forms[0]."+ fieldName))
45:          {
46:             eval("self.document.forms[0]."+ fieldName + ".value = fieldValue");
47:             //document.forms[0].submit( );
48:          }
49:       }
50:       beginFieldMsgLength = theFieldMsgLength;
51:       nameBeginIndex = 1; // after the first field need to remove
         "|" delimiter at the beginning of each name
52:    }
53:
54: }
55:
56: function trim(inputString) {
57:    // Removes leading and trailing spaces from the passed string.
58:    // Also removes consecutive spaces and replaces it with one
       space. If something besides a string is passed
59:    // in (null, custom object, etc.) then return the input
       .
60:    if (typeof inputString != "string") { return inputString; }
61:    var retValue = inputString;
62:    var ch = retValue.substring(0, 1);
63:    while (ch == " ") { // Check for spaces at the beginning
       of the
       string
64:       retValue = retValue.substring(1, retValue.length);
65:       ch = retValue.substring(0, 1);
66:    }
67:    ch = retValue.substring(retValue.length-1, retValue.length);
68:    while (ch == " ") { // Check for spaces at the end of
       the string
69:       retValue = retValue.substring(0, retValue.length-1
          );
70:       ch = retValue.substring(retValue.length-1, retValue.length);
71:    }
72:    while (retValue.indexOf("  ") != -1) { // Note that there are
       two spaces in the string - look for multiple spaces within the
       string
73:       retValue = retValue.substring(0, retValue.indexOf(
          "  ")) +
       ret-
       Value.substring(retValue.indexOf("  ")+1, retValue.length);
       //
       Again, there are two spaces in each of the strings
74:    }
75:    return retValue; // Return the trimmed string back to
       the user
76: } // Ends the "trim" function
```

Each Content frame's mListen.js routines will also wait for (i.e., listen for) messages from the mPortlet.html of the hidden frame (registrar) and insert data received into the appropriate "INPUT FORM" field. This typically causes the content of the frame to be dynamically updated based upon the message received from another frame. As illustrated at FIG. 8 the contents of content frames 830 and 840 may be updated based upon the message sent from content frame 820.

While the invention is described in some detail with specific reference to a single preferred embodiment and certain alternatives, there is no intent to limit the invention to that particular embodiment or those specific alternatives. For instance, the system and methodology of the present invention may also be used to enhance the ability to conduct information searches by allowing the results of a search performed by a first messaging portlet to be sent to another search query in another portlet on the same page. As another example, the present invention may be used to enhance the peer to peer sharing of information between two (or more) individuals. Individuals could, for instance, exchange messages in a portlet while also sharing and/or updating information in other messaging portlets on the same page. The interactive nature of messaging portlets enables the development and implementation of a wide range of Web applications facilitating information exchanges amongst various users and devices.

Accordingly, those skilled in the art will appreciate that modifications may be made to the preferred embodiment without departing from the teachings of the present invention.

The invention claimed is:

1. A method for interactive content retrieval and display at a computer connected to a network and having Internet access, the method comprising:
providing a plurality of portlets selected by a user from a plurality of sources available via the Internet for retrieval of content for display in a user interface comprising a browser;
in response to user input at the computer, defining a particular message action to be taken in response to user interaction with a first portlet, mapping the particular message action to the first portlet to create a messaging portlet for sending a message to a registrar in response to user interaction with the messaging portlet;
wherein said registrar is located in the browser at the computer;
creating a listener portlet by registering a second portlet selected by the user with the registrar to receive messages from the messaging portlet;
in response to user interaction with the messaging portlet, retrieving particular content for display in the user interface based on the message received by the listener portlet from the messaging portlet; and
displaying the particular content in the user interface, wherein said registrar is located in a window of the browser and passes messages from the messaging portlet to the listener portlet without requiring communication with a remote computer, wherein the first portlet and the listener portlet are both included in the browser and inter-portlet messaging is handled by the browser without host interaction.

2. The method of claim 1, wherein said plurality of portlets comprise a portal.

3. The method of claim 1, wherein a portlet retrieves content selected by the user and extracted from a particular source.

4. The method of claim 1, wherein a portlet displays content in a Web page.

5. The method of claim 4, wherein the Web page is implemented using a markup language.

6. The method of claim 5, wherein the markup language comprises a selected one of HyperText Markup Language (HTML), Extensible Markup Language (XML), Extensible Hypertext Markup Language (XHTML), and Compact HyperText Markup Language (cHTML).

7. The method of claim 1, wherein the first portlet comprises a markup language anchor.

8. The method of claim 1, wherein said retrieving step includes retrieving a selected one of a Web page, a portion of a Web page, database content, spreadsheet data, documents, files, and information from a Common Gateway Interface.

9. The method of claim 1, wherein said messaging portlet is structured as a HyperText Markup Language (HTML) inline frame.

10. The method of claim 1, wherein the listener portlet is structured as a HyperText Markup Language (HTML) inline frame.

11. The method of claim 1, wherein the window of the browser comprises a topmost browser window of a Web page.

12. The method of claim 1, wherein said messaging portlet is implemented using JavaScript.

13. The method of claim 1, wherein the messaging portlet sends a javaScript broadcast message to the listener portlet.

14. The method of claim 1, wherein the message received from said messaging portlet comprises a selected one of an identifier, text, or an attribute.

15. The method of claim 1, further comprising:
creating a second listener portlet by registering a third portlet selected by the user with the registrar to receive messages from said messaging portlet; and
in response to user interaction with said messaging portlet, retrieving particular content for display in the user interface based on the message received by the second listener portlet from the messaging portlet.

16. The method of claim 1, further comprising:
mapping a message action to the listener portlet;
creating a second listener portlet by registering a third portlet selected by the user with the registrar to listen for messages from the listener portlet; and
in response to the message received by the listener portlet from the messaging portlet, retrieving particular content for display in the user interface based on the message received by the second listener portlet from the listener portlet.

17. A non-transitory computer-readable medium having processor-executable instructions for performing the method of claim 1.

18. The method of claim 1 further comprising:
downloading a set of processor-executable instructions for performing the method of claim 1.

19. A system for interactive content retrieval and display at a computer connected to a network access and having Internet access, the system comprising:
a user interface, configured to operated on the computer, comprising a browser and including a display, for display of content,
the computer further being configured for a user to create an actioner module by defining a message action and associating the message action with the content selected by the user from a plurality of sources available via the Internet,
wherein the actioner module is configured for display of the selected content in the user interface and sending a message based on user interaction with said actioner module;
a registrar located in the browser at the computer for receiving the message from said actioner module and routing the message to at least one listener module registered to receive the message; and
at least one listener module selected by the user registered for receiving the message from the registrar and retrieving and displaying content in the user interface based on the message sent by the actioner module,
wherein said at least one listener module registers with the registrar to receive the message from the actioner module,
wherein the registrar is located in a window of the browser and passes messages from the actioner module to the listener module without requiring communication with a remote computer, and
wherein the actioner module and the at least one listener module are both included in the browser and messaging between the actioner module and the at least one listener module is handled by the browser without host interaction.

20. The system of claim 19, wherein said actioner module comprises a portlet.

21. The system of claim 20, wherein said portlet retrieves and extracts content from a particular source.

22. The system of claim 19, wherein at least one listener module displays content in a Web page.

23. The system of claim 22, wherein the Web page is implemented using a markup language.

24. The system of claim 23, wherein the markup language comprises a selected one of HyperText Markup Language (HTML), Extensible Markup Language (XML), Extensible Hypertext Markup Language (XHTML), and Compact HyperText Markup Language (cHTML).

25. The system of claim 19, wherein said actioner module comprises a markup language anchor.

26. The system of claim 19, wherein said at least one listener module retrieves a selected one of a Web page, a portion of a Web page, database content, spreadsheet data, documents, files, and information from a Common Gateway Interface.

27. The system of claim 19, wherein said actioner module is structured as a HyperText Markup Language (HTML) inline frame.

28. The system of claim 19, wherein said at least one listener module is structured as a HyperText Markup Language (HTML) inline frame.

29. The system of claim 19, wherein the window of the browser comprises a topmost browser window of a Web page.

30. The system of claim 19, wherein said actioner module is implemented using JavaScript.

31. The system of claim 19, wherein the actioner module sends a javaScript broadcast message in response to user interaction.

32. The system of claim 19, wherein the message received by said at least one listener module comprises a selected one of an identifier, text, or an attribute.

33. The system of claim 19, wherein the computer is configured to enable a user to select from a plurality of message actions in creating the actioner portlet.

34. The system of claim 19, further comprising:
a listener messaging module registered to receive the message from the actioner module and send a message based on the message received from the actioner module.

35. The system of claim 34, wherein said listener messaging module retrieves content for display in the user interface based on the message sent by the actioner module.

36. In a computer connected to a network and having Internet access, a method for collaborative retrieval and display of information in a Web page, the method comprising:
retrieving a plurality of elements selected by a user from a plurality of sources available via the Internet for display of information in a Web page;
creating a registrar for receiving a message and routing the message to at least one listener element registered to receive the message;
wherein said registrar is located in a browser at the computer;
associating a message action specified by the user with a first element for sending a message in response to user interaction with the first element;
registering at least one listener element selected by the user with the registrar for receiving a message sent by the first element; and
in response to user interaction with the first element, displaying particular information on the Web page based on the message received by said at least one listener element from the first element,
wherein said displaying step includes displaying particular content based on the message received by the listener element,
wherein the message is received by the listener element from the first element without requiring communication with a remote computer, and
wherein the first element and the listener element are both included in the browser and messaging between the first element and the listener element is handled by the browser without host interaction.

37. The method of claim 36, wherein said plurality of elements comprise a portal.

38. The method of claim 36, wherein an element retrieves and extracts information from a particular source.

39. The method of claim 36, wherein an element comprises a markup language element.

40. The method of claim 36, wherein the first element comprises a markup language anchor.

41. The method of claim 36, wherein said displaying step includes displaying a selected one of a Web page, a portion of a Web page, database content, spreadsheet data, documents, files, and information from a Common Gateway Interface.

42. The method of claim 36, wherein said Web page is displayed by a Web browser.

43. The method of claim 36, wherein said first element is structured as a HyperText Markup Language (HTML) inline frame.

44. The method of claim 36, wherein said at least one listener element is structured as a HyperText Markup Language (HTML) inline frame.

45. The method of claim 36, wherein a window of the browser comprises a topmost browser window of a Web page.

46. The method of claim 36, wherein the first element sends a javaScript broadcast message in response to user interaction.

47. The method of claim 36, wherein the message received by said at least one listener element comprises a selected one of an identifier, text, or an attribute.

48. The method of claim 36, wherein the first element comprises a listening element registered to receive a message from a particular element on the Web page.

49. The method of claim 48, wherein the first element sends a message when it receives a message from said particular element.

50. The method of claim 36, wherein at least some of said listener elements have associated message actions for sending messages to other elements.

51. A non-transitory computer-readable medium having processor-executable instructions for performing the method of claim 36.

52. A method of claim 36, further comprising:
downloading a set of processor-executable instructions for performing the method of claim 36.

* * * * *